(12) United States Patent
Moon et al.

(10) Patent No.: US 10,404,639 B2
(45) Date of Patent: Sep. 3, 2019

(54) METHOD FOR SHARING CONTENT GROUP OF ELECTRONIC DEVICE AND ELECTRONIC DEVICE THEREOF

(71) Applicant: SAMSUNG ELECTRONICS CO., LTD., Suwon-si, Gyeonggi-do (KR)

(72) Inventors: Tae-Yong Moon, Gumi-si (KR); Tae-Jun Kim, Gumi-si (KR); Hyun-Woo Kim, Daegu (KR); Young-Seung Seo, Daegu (KR); Yeon-Ju Song, Daegu (KR); Hye-Won Oh, Gumi-si (KR); Sang-Jin Lee, Gumi-si (KR); Seong-Joon Cho, Gumi-si (KR); Hyun-Bum Ju, Gumi-si (KR); Jun-Kyu Park, Gumi-si (KR); In-Wook Song, Seoul (KR); Eun-Yeung Lee, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 213 days.

(21) Appl. No.: 15/435,730

(22) Filed: Feb. 17, 2017

(65) Prior Publication Data
US 2017/0244655 A1    Aug. 24, 2017

(30) Foreign Application Priority Data

Feb. 19, 2016  (KR) ........................ 10-2016-0019766

(51) Int. Cl.
*H04L 12/58* (2006.01)
*H04L 12/18* (2006.01)
(Continued)

(52) U.S. Cl.
CPC ............ *H04L 51/10* (2013.01); *H04L 12/185* (2013.01); *H04L 51/14* (2013.01); *H04L 51/34* (2013.01);
(Continued)

(58) Field of Classification Search
CPC ......... H04L 51/10; H04L 51/14; H04L 51/34; H04L 51/04; H04L 65/1089; H04L 65/403; H04L 65/1093; H04L 51/08; H04L 51/046; H04L 51/32; H04L 12/185; H04L 65/601; H04L 67/26; G06Q 50/01; G06Q 50/10; G06Q 10/10; G06Q 10/1095; G06Q 10/101; G06F 3/04842; H04M 1/274516; H04N 21/8549
(Continued)

(56) References Cited

U.S. PATENT DOCUMENTS

2010/0146597 A1* 6/2010 Tanaka ................ G06F 17/3089
726/4
2013/0332854 A1 12/2013 Roman et al.
(Continued)

*Primary Examiner* — Jungwon Chang
(74) *Attorney, Agent, or Firm* — Nixon & Vanderhye P.C.

(57) ABSTRACT

According to various example embodiments, a method for sharing a content group of an electronic device may include transmitting, to a server, information for a request to share a content group; receiving an input selecting at least one contact with which the content group is to be shared; transmitting information on the at least one contact to the server; and changing the content group to a shared state when information on the acceptance of sharing the content group from at least one external electronic device corresponding to the at least one contact is received from the server, wherein the content group is capable of being updated by the electronic device or the at least one external electronic device.

15 Claims, 23 Drawing Sheets

(51) Int. Cl.
*G06Q 10/10* (2012.01)
*H04L 29/06* (2006.01)
*H04L 29/08* (2006.01)

(52) U.S. Cl.
CPC .......... *G06Q 10/101* (2013.01); *H04L 51/046* (2013.01); *H04L 51/08* (2013.01); *H04L 51/32* (2013.01); *H04L 65/1089* (2013.01); *H04L 65/601* (2013.01); *H04L 67/26* (2013.01)

(58) Field of Classification Search
USPC ................................ 709/204–206; 455/414.1
See application file for complete search history.

(56) References Cited

U.S. PATENT DOCUMENTS

| | | | |
|---|---|---|---|
| 2014/0240440 A1* | 8/2014 | Seo .................. | H04L 51/04 348/14.03 |
| 2014/0280561 A1* | 9/2014 | DuBois .................. | H04L 67/02 709/204 |
| 2015/0180980 A1* | 6/2015 | Welinder .............. | H04L 65/403 715/758 |
| 2015/0350265 A1* | 12/2015 | O'Brien ................ | H04L 65/403 709/204 |
| 2015/0370909 A1* | 12/2015 | Volach ............... | G06Q 30/0269 707/722 |
| 2016/0150063 A1* | 5/2016 | Choi .............. | H04M 1/274516 455/414.1 |
| 2016/0197969 A1* | 7/2016 | Bai .................. | H04L 29/06 709/204 |
| 2016/0239547 A1* | 8/2016 | Lim .................. | G06F 3/04842 |
| 2016/0261527 A1* | 9/2016 | Huang .................. | H04L 51/08 |
| 2016/0334967 A1* | 11/2016 | Rottler .................. | G06Q 10/10 |
| 2017/0039528 A1* | 2/2017 | Becker ............... | G06Q 10/1095 |
| 2017/0164163 A1* | 6/2017 | Lee ........................ | G06Q 50/10 |

\* cited by examiner

METHOD FOR SHARING CONTENT GROUP OF ELECTRONIC DEVICE AND ELECTRONIC DEVICE THEREOF

CROSS-REFERENCE TO RELATED APPLICATION

This application is based on and claims priority under 35 U.S.C. § 119 to Korean Application Serial No. 10-2016-0019766, which was filed in the Korean Intellectual Property Office on Feb. 19, 2016, the content of which is incorporated by reference herein in its entirety.

TECHNICAL FIELD

The present disclosure relates generally to a method for sharing a content group of an electronic device and an electronic device thereof.

BACKGROUND

The wide use of portable electronic devices with a camera function, such as smartphones and tablet PCs, enables electronic device users to take a picture or video anywhere anytime. Accordingly, electronic device users frequently take pictures or videos to record their daily lives in pictures or videos.

In recent times, there is a growing number of users that share their captured images including pictures or videos with other people. To this end, various techniques, such as email, Bluetooth, and Multimedia Messaging Service (MMS), have been developed to enable an electronic device to transmit images to another electronic device. In addition, techniques have been developed that enable an electronic device to form a common space in a specific server using an account and to upload desired images to be shared through the space, thus sharing the desired images with other people.

Conventionally, to share a content group including significant images with other people, a user needs to select each desired image stored in an electronic device and to unilaterally transmit the image to an electronic device of another person. Alternatively, the user needs to upload desired images using an account of a specific server to share the images with other people, which causes an inconvenience of creating the account in the server to share the images.

SUMMARY

Therefore, various example embodiments provide a novel method for sharing a content group of an electronic device and an electronic device thereof, which enable a content group to be shared among a plurality of people.

In addition, various example embodiments provide a method for sharing a content group of an electronic device and an electronic device thereof, which enable a plurality of people to share a content group and allow all participating members who are sharing to update the content group. Accordingly, communications and interaction between people sharing a content group may be facilitated and a content group may become more significant.

A method for sharing a content group of an electronic device according to an example embodiment may include: transmitting, to a server, information for a request to share a content group; receiving an input of selecting at least one contact with which the content group is to be shared; transmitting information on the at least one contact to the server; and changing the content group to a shared state when information on the acceptance of sharing the content group from at least one external electronic device corresponding to the at least one contact is received from the server, wherein the content group may be updatable by the electronic device or the at least one external electronic device.

An electronic device according to an example embodiment may include: a communication interface comprising communication circuitry; an input device comprising input circuitry; a storage unit; and a controller configured to: transmit, to a server, information for a request to share a content group through the communication circuitry of the communication interface; receive an input of selecting at least one contact with which the content group is to be shared, which is stored in the storage unit, through the input circuitry of the input device; transmit information on the at least one contact to the server through the communication circuitry of the communication interface; and change the content group to a shared state when information on the acceptance of sharing the content group from at least one external electronic device corresponding to the at least one contact is received from the server through the communication circuitry of the communication interface, wherein the content group may be updated by the electronic device or the at least one external electronic device.

A method for sharing a content group of an electronic device and an electronic device thereof according to various example embodiments may enable a significant content group to be easily shared among different people and may allow all participating members in sharing to update the content group. Further, the method and the electronic device may enhance the consumption of existing images using a function of recommending a relevant image in a created content.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
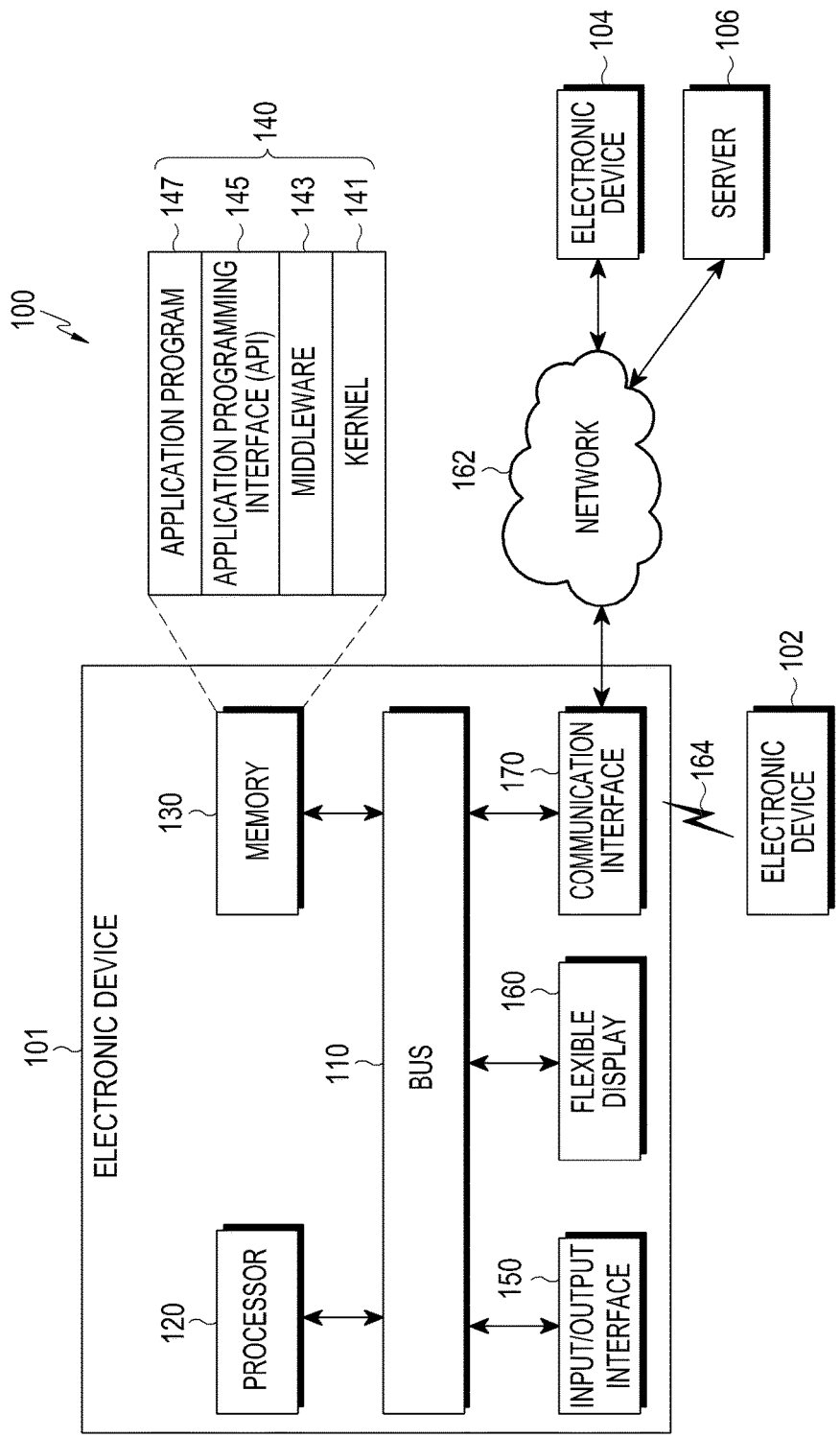
FIG. 1 is a diagram illustrating an example network environment including an electronic device according to various example embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may refer, for example, to a situation in which the device, together with other devices or components, "is able to". For example, the phrase "processor adapted (or configured) to perform A, B, and C" may refer, for example, to a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HIVID)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like but is not limited thereto. According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like but is not limited thereto. In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various example embodiments is described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some example embodiments, at least one of the components may be omitted or an additional component may be further included in the electronic device 101. The bus 110 may include a circuit that connects the components 110 to 170 to each other and delivers communications (for example, control messages or data) between the components. The processor 120 may include various processing circuitry, such as, for example, and without limitation, one or more of a dedicated processor, a central processing unit, an application processor, and a communication processor (CP). The processor 120 may control, for example, at least one different component of the electronic device 101 and/or may perform an operation relating to communication or data processing.

The memory 130 may include a volatile and/or nonvolatile memory. The memory 130 may store, for example, a command or data related to at least one different component of the electronic device 101. According to one example embodiment, the memory 130 may store software and/or a program 140. The program 140 may include, for example, a kernel 141, middleware 143, an application programming interface (API) 145, and/or an application program (or "application") 147. At least part of the kernel 141, the middleware 143, and the API 145 may be designated as an operating system. The kernel 141 may control or manage system resources (for example, the bus 110, the processor 120, the memory 130, or the like) used to perform an operation or function implemented in other programs (for example, the middleware 143, the API 145, or the application program 147). Further, the kernel 141 may provide an interface that allows the middleware 143, the API 145, or the application program 147 to access an individual component of the electronic device 101 to thereby control or manage the system resources.

The middleware 143 may serve as a relay so that, for example, the API 145 or the application program 147 communicates with the kernel 141 to exchange data. Further, the middleware 143 may process one or more requests for operations received from the application program 147 according to priority. For example, the middleware 143 may assign at least one application program 147 a priority for using a system resource (for example, the bus 110, the processor 120, the memory 130, or the like) of the electronic device 101 and may process the one or more requests for operations. The API 145 is an interface for the application 147 to control a function provided from the kernel 141 or the middleware 143 and may include, for example, at least one interface or function (for example, a command) for file control, window control, image processing, or text control. The input/output interface 150 may deliver a command or data, which is input from, for example, a user or different external device, to a different component(s) of the electronic device 101 or may output a command or data, which is received from a different component(s) of the electronic device 101, to the user or different external device.

The display 160 may include, for example, a liquid crystal display (LCD), a light emitting diode (LED) display, an organic light emitting diode (OLED) display, a microelectromechanical systems (MEMS) display, and an electronic paper display, or the like, but is not limited thereto. The display 160 may display, for example, various types of content (for example, a text, an image, a video, an icon, and/or a symbol) for the user. The display 160 may include a touch screen and may receive touch, gesture, proximity, or hovering inputs using, for example, an electronic pen or a user body part. The communication interface 170 may include various communication circuitry configured to establish communication, for example, between the electronic device 101 and an external device (for example, a first external electronic device 102, a second external electronic device 104, or a server 106). For example, the communication interface 170 may be connected to a network 162 via wireless communication or wire-based communication to communicate with the external device (for example, the second external electronic device 104 or the server 106). For example, the communication interface 170 may be connected to an external electronic device 102 via short-range wireless communication 164.

The wireless communication may include cellular communication using, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one example embodiment, the wireless communication may include, for example, at least one of Wireless Fidelity (Wi-Fi), Bluetooth, Bluetooth Low Energy (BLE), Zigbee, Near Field Communication (NFC), Magnetic Secure Transmission, Radio Frequency (RF), and Body Area Network (BAN). According to one example embodiment, the wireless communication may include Global Navigation Satellite System (GNSS). The GNSS may be, for example, a Global Positioning System (GPS), a global navigation satellite system (Glonass), a Beidou navigation satellite system (hereinafter, "Beidou"), or Galileo, which is the European global satellite-based navigation system. In the present document, "GPS" may be interchangeably used with "GNSS" hereinafter. The wire-based communication may include, for example, at least one of Universal Serial Bus (USB), High Definition Multimedia Interface (HDMI), Recommended Standard 232 (RS-232), Power Line Communication, and Plain Old Telephone Service (POTS). The network 162 may include a telecommunications network, for example, at least one of a computer network (for example, a Local Area Network (LAN) or Wide Area Network (WAN)), the Internet, and a telephone network.

The first and second external electronic devices 102 and 104 may each be a device of a type that is the same as, or different from, the electronic device 101. According to various example embodiments, all or part of operations performed in the electronic device 101 may be performed in another electronic device or a plurality of electronic devices (for example, the electronic devices 102 and 104 or the server 106). According to one example embodiment, when the electronic device 101 needs to perform a function or service automatically or by request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional function and may transmit the result to the electronic device 101. The electronic device 101 may provide the requested function or service by using the same received result or by additionally processing the result. To this end, cloud computing, distributed computing, or client-server computing technologies may be used.

Figure 2:
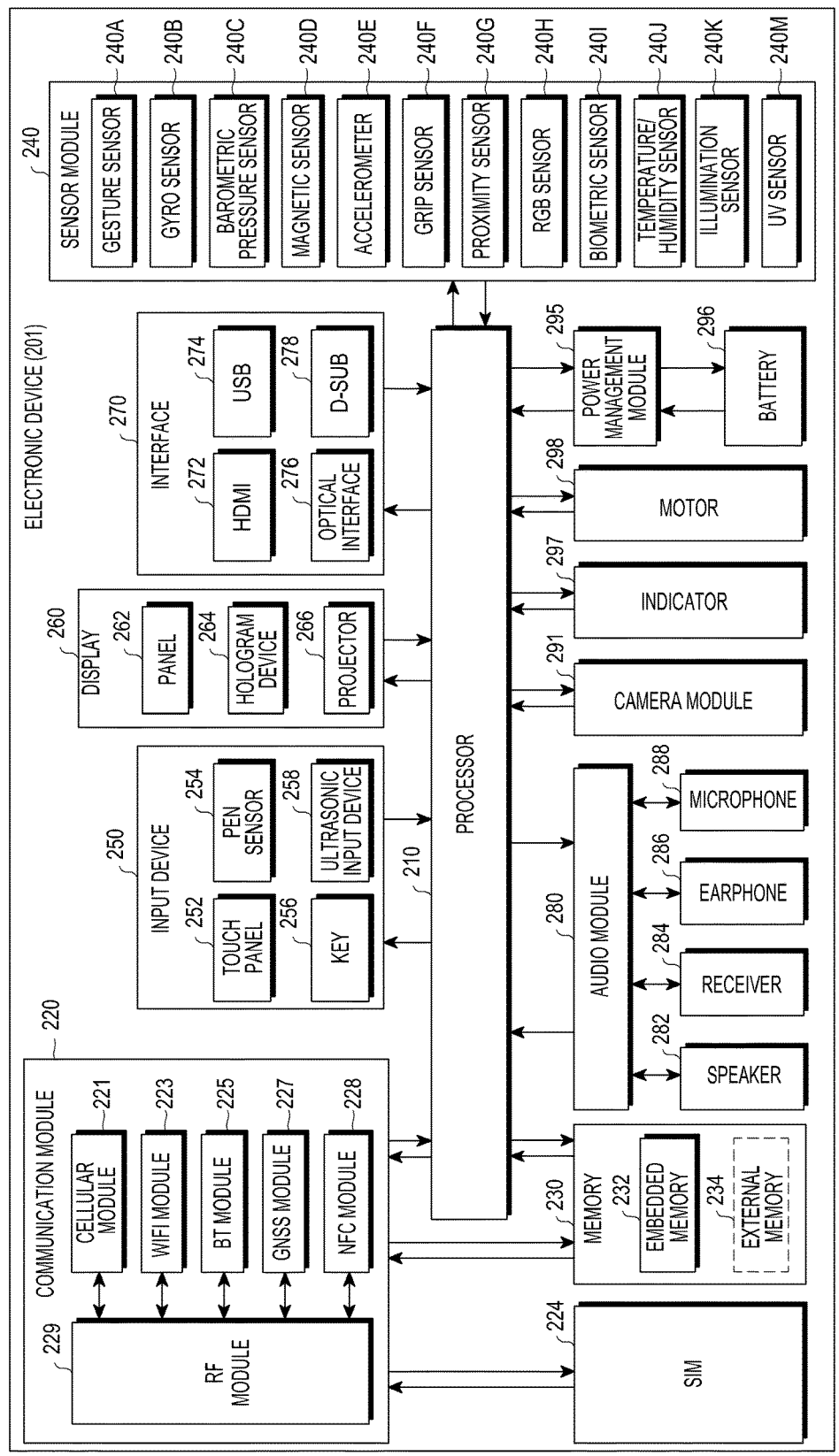
FIG. 2 is a block diagram illustrating an example electronic device according to various example embodiments.

FIG. 2 is a block diagram illustrating an example electronic device 201 according to various example embodiments. The electronic device 201 may include, for example, the whole or part of the electronic device 101 illustrated in FIG. 1. The electronic device 201 may include one or more processors (for example, APs) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298. The processors 210 may run, for example, an OS or an application program to control a plurality of hardware or software components that are connected to the processors 210 and may perform various kinds of data processing and operations. The processors 210 may include various processing circuitry and may be configured, for example, as a system on chip (SoC). According to one example embodiment, the processors 210 may further include a graphic processing unit (GPU) and/or an image signal processor. The processors 210 may include at least part (for example, a cellular module 221) of the components illustrated in FIG. 2. The processors 210 may load a command or data received from at least one of the other components (for example, a nonvolatile memory) into a volatile memory to process the command or data and may store the resulting data in the nonvolatile memory.

The communication module 220 may have a configuration that is the same as, or similar to, that of the communication interface 170. The communication module 220 may include various communication circuitry, such as, for example, and without limitation, a cellular module 221, a Wi-Fi module 223, a Bluetooth module 225, a GNSS module 227, an NFC module 228, and an RF module 229. The cellular module 221 may provide, for example, a voice call, a video call, a text messaging service, or an Internet service through a communication network. According to one example embodiment, the cellular module 221 may perform identification and authentication of the electronic device 201 in a communication network using the SIM (for example, an SIM card) 224. According to one example embodiment, the cellular module 221 may perform at least part of the functions provided by the processors 210. According to one example embodiment, the cellular module 221 may include a communication processor (CP). According to one example embodiment, at least part (for example, two or more) of the cellular module 221, the Wi-Fi module 223, the Bluetooth module 225, the GNSS module 227, and the NFC module 228 may be included in one integrated chip (IC) or IC package. The RF module 229 may transmit and receive, for example, a communication signal (for example, an RF signal). The RF module 229 may include, for example, a transceiver, a power amplifier (amp) module (PAM), a frequency filter, a low noise amplifier (LNA), an antenna, or the like. According to another example embodiment, at least one of the cellular module 221, the Wi-Fi module 223, the Bluetooth module 225, the GNSS module 227, and the NFC module 228 may transmit and receive an RF signal through a separate RF module. The SIM 224 may include, for example, a card including an SIM or an embedded SIM and may include unique identification information (for example, an Integrated Circuit Card Identifier (ICCID)) or subscriber information (for example, an International Mobile Subscriber Identity (IMSI)).

The memory 230 (for example, a memory 130) may include, for example, an internal memory 232 and/or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable And Programmable ROM (EPROM), an Electrically Erasable Programmable ROM (EEPROM), a mask ROM, a flash ROM, a flash memory, a hard drive, or a Solid State Drive (SSD)). The external memory 234 may include a flash drive, for example, a Compact Flash (CF), a Secure Digital (SD), a Micro-SD, a Mini-SD, an extreme digital (xD), a Multi-Media Card (MMC), a memory stick, or the like. The external memory 234 may be functionally or physically connected to the electronic device 201 through various interfaces.

The sensor module 240 may measure, for example, physical quantities or may detect an operation state of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one example embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response. The (digital) pen sensor 254 may, for example, be part of the touch panel or include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, a display 160) may include a panel 262, a hologram device 264, a projector 266, and/or a control circuit to control the panel 262, the hologram device 264, and the projector 266. The panel 262 may be configured, for example, to be flexible, transparent, or wearable. The panel 262 may be formed with the touch panel 252 in one or more modules. According to one example embodiment, the panel 262 may include a pressure sensor (or force sensor) to measure the strength of pressure caused by a user touch. The pressure sensor may be configured in an integrated form with the touch panel 252 or may be configured as one or more sensors separate from the touch panel 252. The hologram device 264 may display a three-dimensional image in the air using the interference of light. The projector 266 may project light onto a screen to display an image. The screen may be disposed, for example, inside or outside the electronic device 201. The interface 270 may include various interface circuitry, such as, for example, and without limitation, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 may convert, for example, a sound and an electrical signal reciprocally. At least some components of the audio module 280 may be included, for example, in an input/output interface 150 illustrated in FIG. 1. The audio module 280 may process sound information input or output, for example, through a speaker 282, a receiver 284, earphones 286, or the microphone 288. The camera module 291 is a device that takes, for example, a still image and a video. According to one example embodiment, the camera module 291 may include one or more image sensors (for example, a front sensor or a rear sensor), a lens, an image signal processor (ISP), or a flash (for example, an LED, a xenon lamp, or the like). The power management module 295 may manage, for example, the power of the electronic device 201. According to one example embodiment, the power management module 295 may include a power management integrated circuit (PMIC), a charger integrated circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display a specific state of the electronic device 201 or a component thereof (for example, the processors 210), for example, a booting state, a message state, or a charging state. The motor 298 may convert an electrical signal into mechanical vibrations and may generate vibrations or a haptic effect. The electronic device 201 may include a mobile TV supporting device (for example, a GPU) that is capable of processing media data in accordance with, for example, digital multimedia broadcasting (DMB), digital video broadcasting (DVB), or mediaFlo™ standards. Each of the above-described component elements of hardware according to the present disclosure may be configured with one or more components, and the names of the corresponding component elements may vary based on the type of electronic device. According to various embodiments, the electronic device (e.g., the electronic device 201) does not include some elements or further include additional elements. Some of elements are coupled to constitute one object but the electronic device may perform the same functions as those which the corresponding elements have before being coupled to each other.

Figure 3:
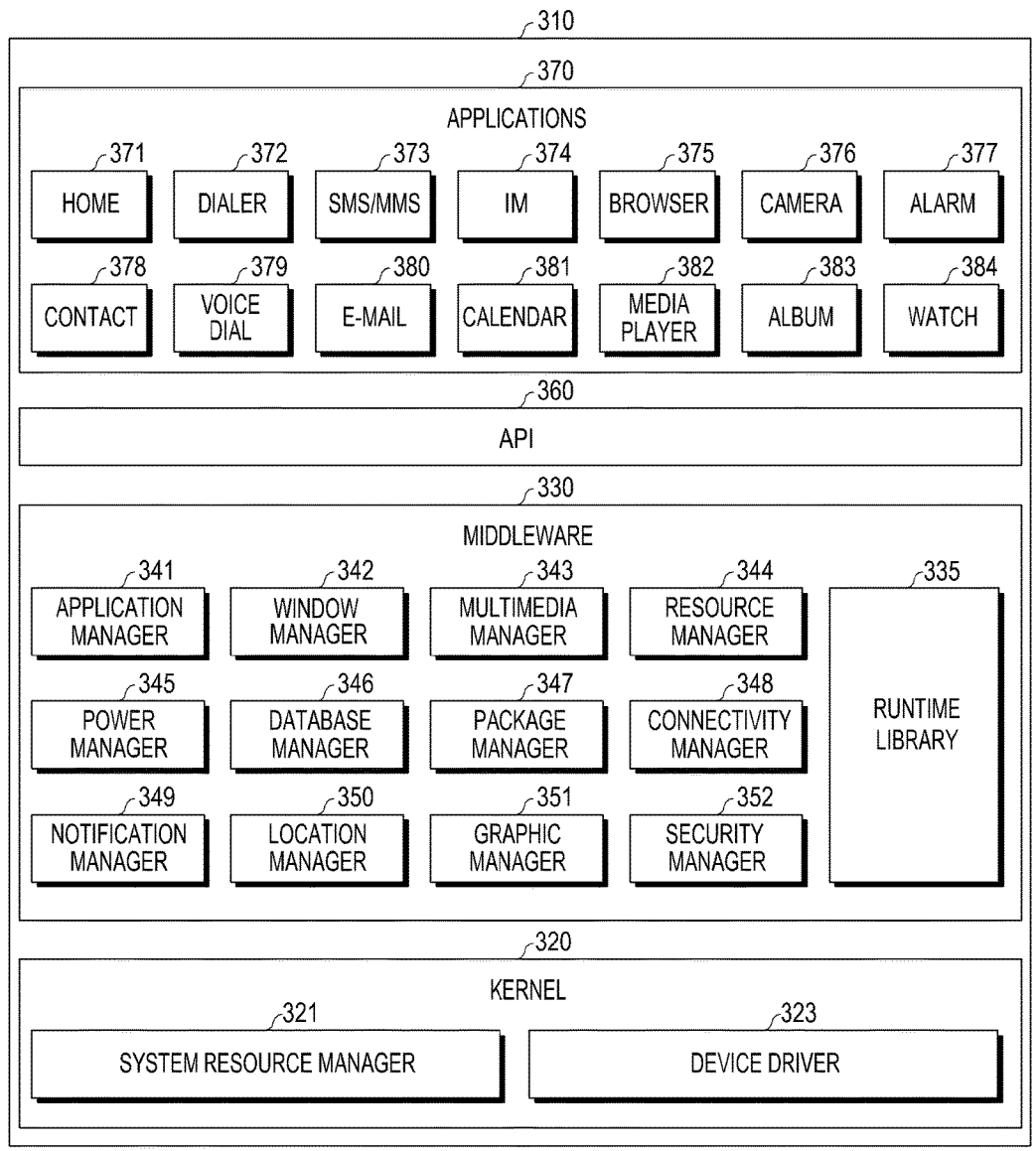
FIG. 3 is a block diagram illustrating an example program module according to various example embodiments.

FIG. 3 is a block diagram illustrating an example program module according to various example embodiments. According to one example embodiment, the program module 310 (for example, the program 140) may include an operating system that controls resources related to an electronic device (for example, the electronic device 101) and/or various applications (for example, the application program 147) that run on the operating system. The operating system may be, for example, Android™, iOS™, Windows', Symbian™, Tizen™, or Bada™. Referring to FIG. 3, the program module 310 may include a kernel 320 (for example, the kernel 141), middleware 330 (for example, the middleware 143), an API 360 (for example, the API 145), and/or an application 370 (for example, the application program 147). At least part of the program module 310 may be preloaded onto the electronic device or be downloaded from an external electronic device (for example, the electronic device 102 or 104, the server 106, or the like).

The kernel 320 may include, for example, a system resource manager 321 and/or a device driver 323. The system resource manager 321 may perform the control, allocation, or recovery of system resources. According to one example embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication ((IPC) driver. The middleware 330 may provide, for example, a function commonly needed for an application 370 or may provide the application 370 with various functions through the API 360 so that the application 370 may use limited systems resources in the electronic device. According to one example embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform input/output management, memory management, or arithmetic function processing. The application manager 341 may manage, for example, the life cycle of the application 370. The window manager 342 may manage graphic user interface (GUI) resources used for a screen. The multimedia manager 343 may identify formats necessary to play media files and may encode or decode a media file using a codec suitable for a corresponding format. The resource manager 344 may manage a source code of the application 370 or a memory space. The power manager 345 may manage, for example, a battery level or power and may provide power information necessary for an operation of the electronic device. According to one example embodiment, the power manager 345 may interwork with a basic input/output system (BIOS). The database manager 346 may generate, retrieve, or change a database to be used, for example, for the application 370. The package manager 347 may install or update an application distributed in the form of a package file.

The connectivity manager 348 may manage, for example, wireless connectivity. The notification manager 349 may provide a user with, for example, an incoming message, an appointment, and an event including a proximity notification. The location manager 350 may manage, for example, location information on the electronic device. The graphic manager 351 may manage, for example, a graphic effect to be provided for the user or a user interface related to the graphic effect. The security manager 352 may provide, for example, system security or user authentication. According to one example embodiment, the middleware 330 may include a telephony manager to manage a voice or video call function of the electronic device or a middleware module that is capable of forming combinations of functions of the foregoing components. According to one example embodiment, the middleware 330 may provide a specialized module for each type of an operating system. The middleware 330 may dynamically delete some of the existing components or add new components. The API 360 is, for example, a set of API programming functions and may be provided with a different configuration depending on an OS. For example, one API set for each platform may be provided in Android or iOS, while two or more API sets for each platform may be provided in Tizen.

The application 370 may include, for example, a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care application (for example, for measuring exercising or blood sugar), or an environmental data application (for example, for providing atmospheric pressure, humidity, or temperature data). According to one example embodiment, the application 370 may include an information exchange application that supports information exchanges between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device or may receive notification information from the external electronic device to provide the notification information to the user. The device management application may install, delete, or update, for example, a function (for example, a function of turning on/turning off the external electronic device itself (or some components) or adjusting the brightness (or resolution) of a display) of the external electronic device communicating with the electronic device or an application operating in the external electronic device. According to one example embodiment, the application 370 may include an application (for example, a health care application of a mobile medical device) assigned according to an attribute of the external electronic device. According to one example embodiment, the application 370 may include an application received from the external electronic device. At least part of the program module 310 may be implemented (for example, run) in software, firmware, hardware (for example, the processor 210), or combinations of at least two or more thereof and may include a module, a program, a routine, sets of instructions, or a process to perform one or more functions.

Figure 4:
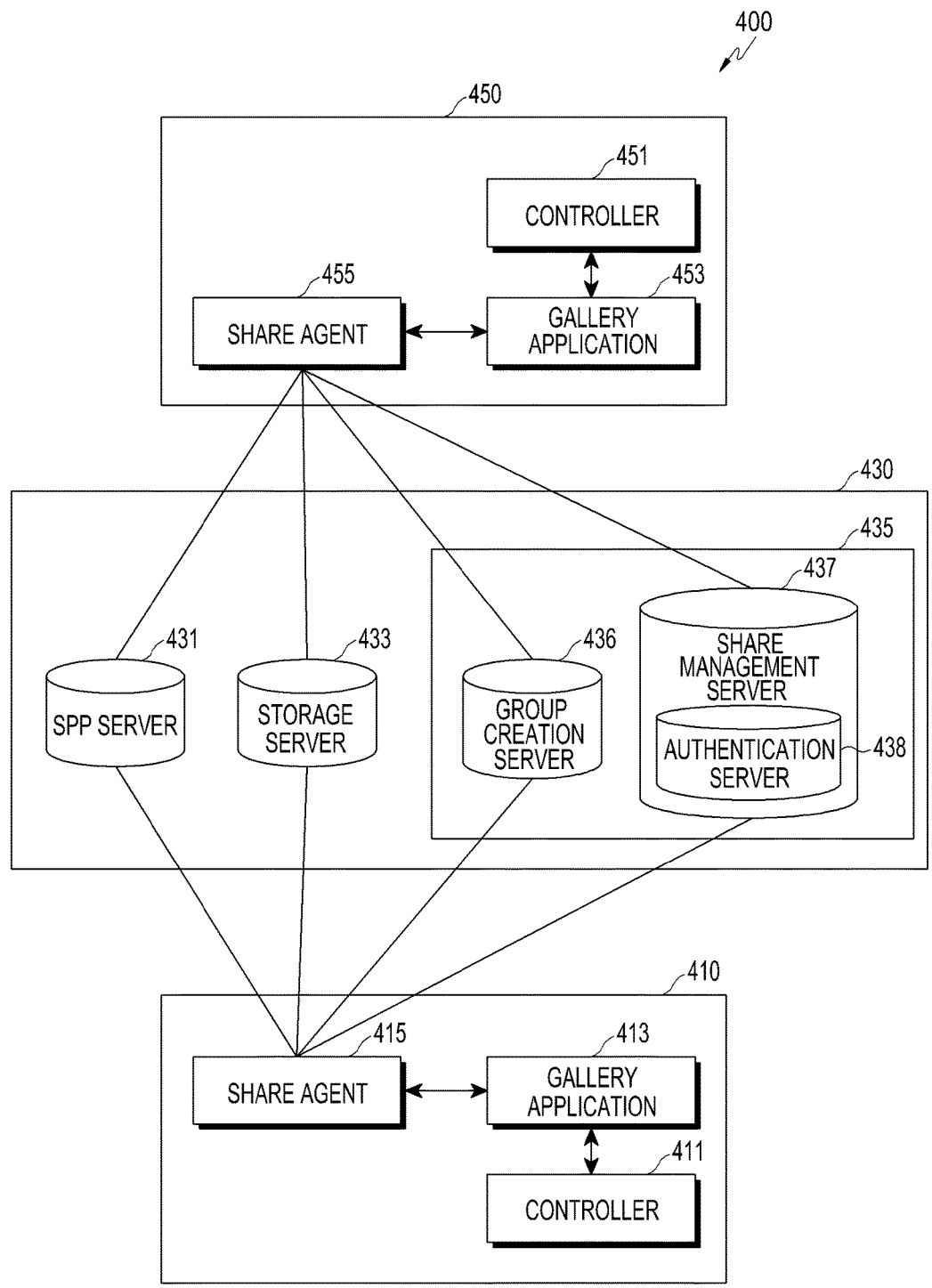
FIG. 4 is a diagram illustrating an example content group sharing system according to various example embodiments.

FIG. 4 is a diagram illustrating an example content group sharing system according to various example embodiments. Referring to FIG. 4, the system 400 may include a first electronic device 410, a server 430, and a second electronic device 450.

The first electronic device 410 may be, for example, the electronic device 101 illustrated in FIG. 1. The first electronic device 410 may include a controller 411, a gallery application 413, and a share agent 415.

The controller 411 may be, for example, the processor 120 illustrated in FIG. 1 and may control the gallery application 413 and the share agent 415. The gallery application 413 may display an image file, such as a picture and a video, in folder and channel formats.

The share agent 415 may be the communication interface 170 illustrated in FIG. 1. The share agent 415 may include various communication circuitry to manage a connection between the server 430 and the first electronic device 410.

The sever 430 may be, for example, the server 106 illustrated in FIG. 1. The server 430 may include a Samsung Push Platform (SPP) server 431, a storage server 433, and a core application server 435. The core application server 435 may include a group creation server 436 and a share management server 437 that manages the sharing of a content group. The share management server 437 may include an authentication server (also referred to as an ESC server or easy sign up server) 438.

The authentication server 438 may authenticate at least one of the first electronic device 410 and the second electronic device 450. After the authentication server 438 authenticates the first electronic device 410 and the second electronic device 450, the group creation server 436 may create a content group based on at least one piece of contact information selected by the first electronic device 410. The storage server 433 may create and store a storage area connected with the content group one to one. When the content group is created, the SPP server 431 may transmit push information for a request to share the content group to the second electronic device 450 corresponding to the at least one selected piece of contact information. When the second electronic device 450 receives the push information, the second electronic device 450 may display the content group requested to be shared through the push information.

The second electronic device 450 may be, for example, the electronic device 104 illustrated in FIG. 1. The second electronic device 450 may include a controller 451, a gallery application 453, and a share agent 455.

The controller 451 may perform a function that is the same as or similar to that of, for example, the processor 120 illustrated in FIG. 1 and may control the gallery application 453 and the share agent 455.

The gallery application 453 may display an image file, such as a picture and a video, in folder and channel formats.

The share agent 455 may perform a function that is the same as or similar to that of the communication interface 170 illustrated in FIG. 1. The share agent 455 may include various communication circuitry to manage a connection between the server 430 and the second electronic device 450.

Figure 5:
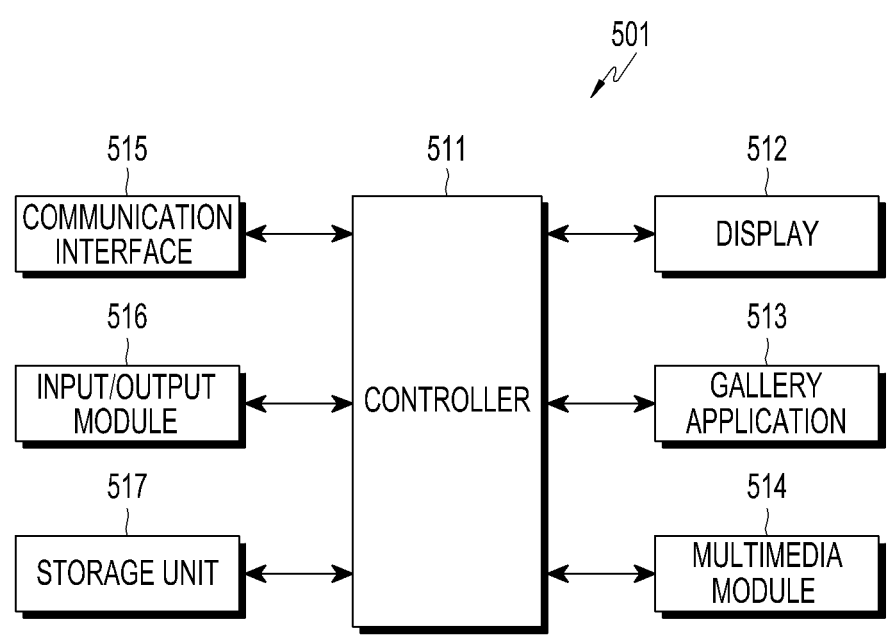
FIG. 5 is a block diagram illustrating an exmaple configuration of an electronic device that shares a content group according to various example embodiments.

FIG. 5 is a diagram illustrating an example configuration of an electronic device that shares a content group according to various example embodiments.

The electronic device 501 may be the electronic device 410 illustrated in FIG. 4. The electronic device 501 may include a controller 511, a display 512, a gallery application 513, a multimedia module 514, a communication interface (e.g., including communication circuitry) 515, an input/output module (e.g., including input/output circuitry) 516, and a storage unit 517.

The controller 511 may control overall operations of the electronic device 501 and may be the controller 411 illustrated in FIG. 4. The controller 511 may control the display 512, the gallery application 513, the multimedia module 514, the communication interface 515, the input/output module 516, and the storage unit 517.

The gallery application 513 may be the gallery application 413 illustrated in FIG. 4. The gallery application 513 may display an image file, such as a picture and a video, in folder and channel formats.

The multimedia module 514 may play a multimedia stored in the electronic device 501.

The communication interface 515 may include various communication circuitry and may control wired or wireless communications of the electronic device 501 and may be the share agent 415 illustrated in FIG. 4.

The input/output module 516 may include various input/output circuitry configured to receive a user input that is input from a user and may be the input/output interface 150 illustrated in FIG. 1.

The storage unit 517 may store various kinds of data to control the electronic device 501 and may be the memory 130 illustrated in FIG. 1.

According to various example embodiments, an electronic device includes: a communication interface comprising communication circuitry; an input device comprising input circuitry; a storage unit; and a controller configured to: transmit, to a server, information for a request to share a content group through the communication interface; receive an input of selecting at least one contact with which the content group is to be shared, which is stored in the storage unit, through the input device; transmit information on the at least one contact to the server through the communication circuitry of the communication interface; and change the content group to a shared state when information on acceptance of sharing the content group from at least one external electronic device corresponding to the at least one contact is received from the server through the communication circuitry of the communication interface, wherein the content group is capable of being updated by the electronic device or the at least one external electronic device.

According to various example embodiments, the content group may include at least one image stored in the storage unit.

According to various example embodiments, the controller may transmit the at least one image included in the content group to the server through the communication interface, may convert the at least one image into a thumbnail image in a thumbnail format to store the thumbnail image in the storage unit, and may change the at least one image to the corresponding thumbnail image stored in the storage unit to change the content group to the shared state.

According to various example embodiments, the controller may include information corresponding to the at least one contact stored in the storage unit in the content group.

According to various example embodiments, when a user input for releasing the shared state is received through the input device, the controller may be configured to transmit, to the server, information corresponding to a release from the shared state through the communication interface, and may change the thumbnail image to the corresponding image to change the content group, which is changed to the shared state, to a local state.

According to various example embodiments, when information for releasing the shared state from the at least one external electronic device is received from the server through the communication interface, the controller may change the thumbnail image to the corresponding image to change the content group, which is changed to the shared state, to a local state.

According to various example embodiments, the at least one image may be configured in a link file of an original image stored in the electronic device.

According to various example embodiments, the content group may be an empty content group including no image.

According to various example embodiments, the controller may include at least one image in the content group, may transmit the at least one image included in the content group to the server through the communication interface, and may convert the at least one image into a thumbnail image in a thumbnail format.

According to various example embodiments, the electronic device may further include a display, and when a list indicating whether sharing the content group is accepted by the at least one each contact is received from the server through the communication interface, the controller may display the list indicating whether sharing the content group is accepted on the display. According to various example embodiments, updating may include at least one of including at least one image in the content group and deleting at least one image from the content group.

According to various example embodiments, the electronic device may further include a display, and when there is at least one image corresponding to the content group in the storage unit, the controller may display, on the display, information to recommend including the at least one image in the content group.

FIGS. 6A, 6B, 6C and 6D are diagrams illustrating an example operation in which a first electronic device (for example, the first electronic device 410) creates a content group and shares the content group with a second electronic device (for example, the second electronic device 450) through a server (for example, the server 430) according to various example embodiments.

Figure 6A:
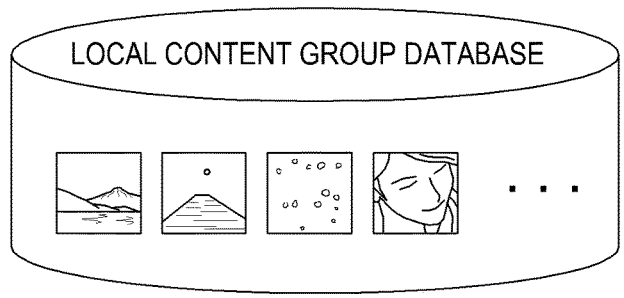
FIGS. 6A, 6B, 6C and 6D are diagrams illustrating an example operation in which a first electronic device creates a content group and shares the content group with a second electronic device through a server according to various example embodiments.

The first electronic device may include a local content group database, and the local content group database may include at least one original image as illustrated in FIG. 6A.

Figure 6B:
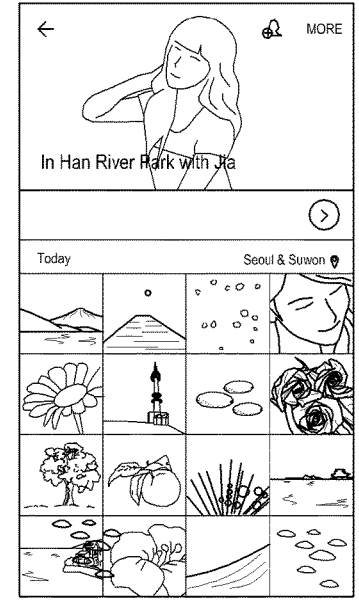

The first electronic device may create a first content group including the at least one original image using the at least one original image in the local content group database and may display a screen corresponding to the first content group as illustrated in FIG. 6B.

To share the first content group, the first electronic device may select at least one member with whom to share the first content group according to a user input, and may share the first content group with the member. For example, the first electronic device may transmit, to the second electronic device of the selected member through the server, first information corresponding to the selected member to which a request to share the first content group is made. Subsequently, the first electronic device may receive acceptance information from the second electronic device through the server and may share the first content group with the second electronic device.

The first electronic device may transmit the at least one original image included in the first content group to the server.

The first electronic device may create a thumbnail image in a thumbnail format (also referred to as a thumbnail image in a JPEG format) corresponding to the at least one original image included in the first content group.

Figure 6C:
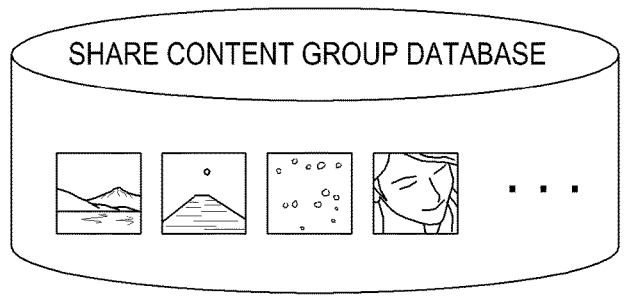

The first electronic device may include a share content group database, and the created thumbnail image may be stored in the share content group database as illustrated in FIG. 6C. The share content group database may also store information on mapping of the thumbnail image to the original image in the local content group database corresponding to the thumbnail image.

Figure 6D:
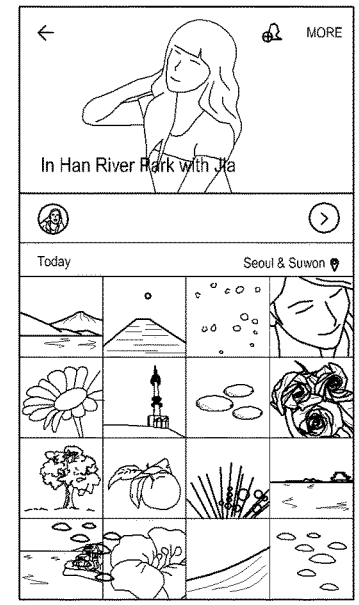

The first electronic device may update the first content group based on the thumbnail image in the share content group database. For example, the first electronic device may change the at least one image included in the first content group into the corresponding thumbnail image and may include the member information in the first content group to change an attribute of the first content group to a share state, thereby displaying a screen corresponding to the attribute-changed first content group, as illustrated in FIG. 6D.

Meanwhile, when sharing the attribute-changed first content group with the second electronic device is stopped, the first electronic device may retrieve an original image of each thumbnail image from the local content group database based on original mapping information on each thumbnail image in the share content group database. When the original image of each thumbnail image is valid, the first electronic device may update the attribute-changed first content group to the first content group including the original image. For example, each thumbnail image in the attribute-changed first content group may be replaced with a corresponding original image, thereby updating an attribute of the attribute-changed first content group to the original first content group.

According to the foregoing example embodiment, the first electronic device may create and store a thumbnail image based on metadata on the original image corresponding to the at least one image included in the first content group. For example, the thumbnail image may be stored in the share content group database along with information on the corresponding original image (for example, a file path of the original image, the size of the original image, a unique allocation number (media ID) for terminal management of the original image). Accordingly, after sharing the first content group with the second electronic device, the attribute-changed first content group is no longer directly associated with the original image, and the original image is not related with the attribute-changed first content group even though the original image is changed (the image is deleted or an image is added).

According to the foregoing example embodiment, when the first electronic device stops sharing the attribute-changed first content group, the first electronic device may delete the thumbnail image included in the attribute-changed first content group and may identify whether the original image corresponding to the thumbnail image is present in the first electronic device. When the original image corresponding to the thumbnail image is present in the first electronic device, the first electronic device may replace the thumbnail image with the original image corresponding to the thumbnail image to change the attribute-changed first content group to the first content group that has not been subjected to an attribute change. When there is no original image corresponding to the thumbnail image, the first electronic device may delete the attribute-changed first content group.

When the second electronic device first receives an image in the shared attribute-changed first content group from the first electronic device, the second electronic device may receive a thumbnail image of the image, not an original image. Here, the second electronic device may also receive metadata on the original image. The second electronic device may store the thumbnail image and the metadata on the original image corresponding to the thumbnail image in a separate database of the second electronic device, not in a general-purpose media database of the second electronic device. The stored thumbnail image and metadata on the original image corresponding to the thumbnail image are not managed in the general-purpose media database of the second electronic device, thus being prevented from being used for general purposes. To download the original image corresponding to the thumbnail image, the user makes a request to download the original image to the server (for example, the server 430) using the metadata on the original image corresponding to the thumbnail image. After the original image is downloaded, a download file path of the original image and a unique allocation number for terminal management of the original image are added to a database area in which the existing thumbnail image is stored.

When the second electronic device stops sharing the attribute-changed first content group, the second electronic device deletes the thumbnail image and identifies whether the original image is actually present in the second electronic device based on information on the downloaded original image connected to the thumbnail image. When the original image is present in the second electronic device, the second electronic device may replace the thumbnail image with the corresponding original image. When all original images have disappeared so that no image belongs to the content group, the content group may be deleted.

Figure 7A:
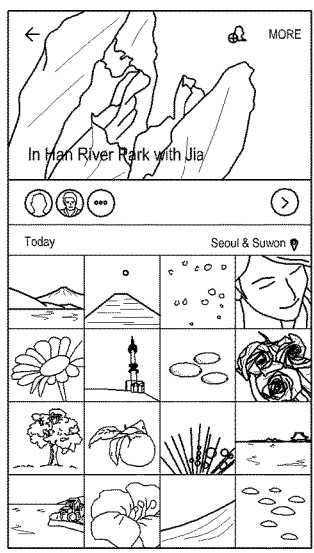
FIGS. 7A, 7B and 7C are diagrams illustrating an example screen corresponding to a content group according to various example embodiments.

According to the foregoing example embodiment, when the first electronic device and the second electronic device share the attribute-changed first content group, the first electronic device and the second electronic device may each display a screen corresponding to the attribute-changed first content group as in FIG. 7A. Each image included in the attribute-changed first content group may be displayed as a thumbnail image on the screen corresponding to the attribute-changed first content group.

Figure 7B:
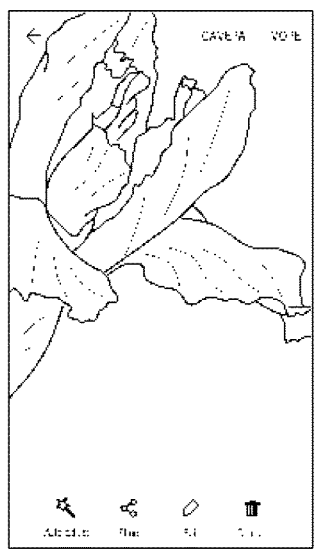

When a first thumbnail image is selected according to a user input on the screen of the first electronic device in FIG. 7A, the first electronic device may display the first thumbnail image on the entire screen as in FIG. 7B. For example, when the first thumbnail image, which has not been downloaded to the first electronic device, is selected, the first electronic device may display the first thumbnail image on the entire screen.

When the first thumbnail image is selected according to a user input on the screen of the second electronic device in FIG. 7A, the second electronic device may display the first thumbnail image on the entire screen as in FIG. 7B. For example, when the first thumbnail image, which has not been downloaded to the second electronic device, is selected, the second electronic device may display the first thumbnail image on the entire screen.

The entire screen of the first thumbnail image may include an auto adjust menu for automatically adjusting the color and brightness of the first thumbnail image, a share menu for sharing the first thumbnail image, an edit menu for editing the first thumbnail image, and a delete menu item for deleting the first thumbnail image from the share content group.

Figure 7C:

When the first thumbnail image is selected according to a user input on the screen of the first electronic device in FIG. 7A, the first electronic device may display a first original image corresponding to the first thumbnail image on the entire screen as in FIG. 7C. For example, in a case where the first original image corresponding to the first thumbnail image is stored in the first electronic device, when the first thumbnail image is selected, the first electronic device may display the first original image connected via a link to a first thumbnail image file on the entire screen.

When the first thumbnail image is selected according to a user input on the screen of the second electronic device in FIG. 7A, the second electronic device may display the first original image corresponding to the first thumbnail image on the entire screen as in FIG. 7C. For example, in a case where the first original image corresponding to the first thumbnail image is downloaded to the second electronic device, when the first thumbnail image is selected, the second electronic device may display the first original image connected via a link to the first thumbnail image file on the entire screen.

The entire screen of the first original image may include an auto adjust menu for automatically adjusting the color and brightness of the first original image, a share menu for sharing the first original image, an edit menu for editing the first original image, and a delete menu item for deleting the first original image from the share content group.

Figure 8:
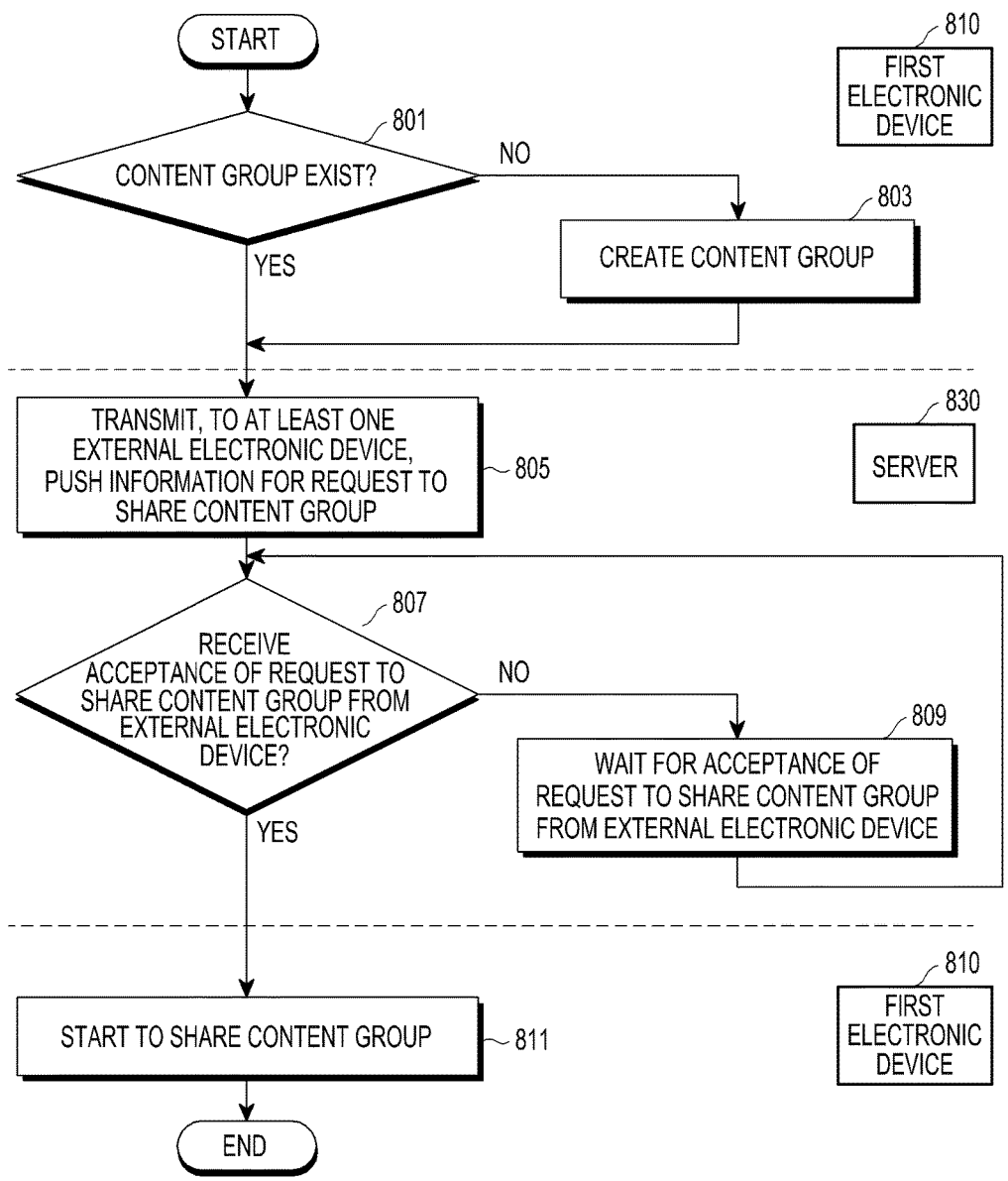
FIG. 8 is a flowchart illustrating an example content group sharing operation according to various example embodiments.

FIG. 8 is a flowchart illustrating an example content group sharing operation according to various example embodiments. Referring to FIG. 8, in operation 810 a first electronic device 810 (for example, the first electronic device 410) may identify whether there is a content group in a gallery application and may make a request to share the content group to at least one counterpart to share a content group with (hereinafter, referred to an external electronic device (for example, the second electronic device 450)) through a server 830 (for example, the server 430). When there is no desired content group, the first electronic device 810 may create a new content group in operation 803 and may make a request to share the content group to the second electronic device through the server 830. When the second electronic device accepts the request, sharing the content group between the first electronic device 810 and the second electronic device may be started through the server 830. Both the first electronic device 810 and the second electronic device, which participate in sharing the content group, may update the content group, for example, by deleting an image in the content group or adding a new image to the content group.

In operation 801, the first electronic device 810 may determine whether there is a content group in a gallery application.

When the first electronic device 810 determines that there is a content group in the gallery application, the server 830 may perform operation 805. When the first electronic device 810 determines that there is no content group in the gallery application, the first electronic device 810 may perform operation 803.

In operation 803, the first electronic device 810 may create a content group.

In operation 805, the server 830 may transmit, to at least one external electronic device, push information for a request to share the content group.

In operation 807, the server 830 may determine whether an acceptance of the request to share the content group is received from the external electronic device. When it is determined that the acceptance of the request to share the content group is received from the external electronic device in operation 807, the server 830 may perform operation 811. Otherwise, the server 830 may perform operation 809.

In operation 809, the server 830 may wait for an acceptance of sharing the content group from the external electronic device.

In operation 811, the first electronic device 810 may start sharing the content group with the external electronic device through the server 830.

The content group refers to a set of images according to a designated condition when the images satisfy the designated condition, in which the images may include a still image (picture), a video, and the like. Further, the content group may be an event or channel. For example, the content group may be a time information-based content group, a time and place information-based content group, a time, place and person information-based content group, a face tag information-based content group, a tag information-based content group, a merged content group, a user selection-based content group, or a live content group.

The time information-based content group may be created by including at least one significant picture among pictures taken within a designated time (for example, 2 hours) excluding duplicate pictures or low-quality pictures detected according to a designated selection criterion. The selection criterion may be, for example, a predetermined criterion for excluding overexposed, underexposed, and/or remarkably seriously blurred images.

The time and place information-based content group may be created by including at least one significant picture among picture taken within a designated time (for example, 2 hours) at the same or similar locations.

The time, place and person-based content group may be created by including at least one significant picture including at least one same person among pictures taken within a preset time at the same or similar locations. The face tag information-based content group may be created with a tag name when there are a predetermine number (for example, 10) or more of images of a face-tagged person.

The tag information-based content group may be created when tag types are classified according to importance and satisfy a condition.

The merged content group may be one content group that is created by merging two or more content groups created according to at least one condition among the foregoing time information, place information, person information, face tag information, and tag information.

The user selection-based event may be created by combining images randomly selected by a user.

The live content group may be an empty content group created without images.

According to various example embodiments, a first electronic device (for example, the first electronic device 410) may share a content group with at least one electronic device (hereinafter, referred to as a second electronic device (for example, the second electronic device 450)). For example, the first electronic device may select a stored content group, may select at least one member to share the content group with, and may share the content group with the second electronic device corresponding to the selected member. The second electronic device may create a content group corresponding to the content group of the first electronic device using information received from the first electronic device and may display the content group on a screen.

Figures 9A, 9B, 9C:
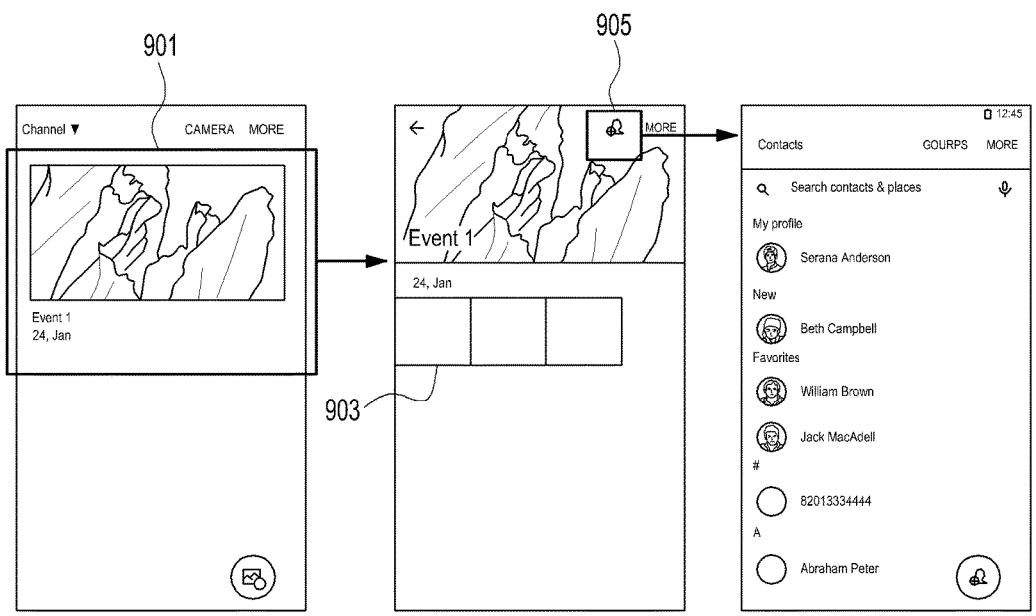
FIGS. 9A, 9B and 9C are diagrams illustrating an example screen of a first electronic device to describe an example operation of sharing a content group between electronic devices according to various example embodiments.

FIGS. 9A, 9B and 9C are diagrams illustrating an example screen of a first electronic device to describe an operation of sharing a content group between electronic devices according to various example embodiments.

When a first content group 901 is selected according to a user input on the screen of the first electronic device (for example, the electronic device 410) displayed in FIG. 9A, the first electronic device may display a detailed screen corresponding to the first content group as in FIG. 9B. The detailed screen corresponding to the first content group may include a plurality of images 903 included in the content group and a member selection menu 905 for selecting a content group sharing member.

When the member selection menu 905 is selected according to a user input, the electronic device may display a list of contacts stored in the first electronic device as in FIG. 9C. At least one contact to share the content group 901 with may be selected according to a user input.

The first electronic device may transmit, to the server, first information for a request to share the first content group 901.

When the first information is received, the server may create a share folder corresponding to the first content group 901. The server may transmit, to the first electronic device, second information indicating that the creation of the share folder has been completed.

When the second information is received, the first electronic device may transmit the plurality of images included in the first content group 901 to the server. Further, the first electronic device may create a thumbnail image corresponding to each of the plurality of images. Further, the server may create a thumbnail image corresponding to each of the plurality of images.

When the transmission of the plurality of images is completed, the server may transmit, to the first electronic device, third information indicating that the transmission of the plurality of images has been completed.

The first electronic device may transmit, to the server, fourth information to transmit information for a request to share the first content group 901 to the second electronic device (for example, the second electronic device 450) corresponding to the selected contact.

The server may transmit, to the second electronic device, the fourth information for the request to share the first content group 901 of the first electronic device. When the fourth information is successfully transmitted to the second electronic device, the server may transmit, to the first electronic device, fifth information indicating that the fourth information has been successfully transmitted. When the fifth information is received, the first electronic device may replace the images of the first content group 901 with the corresponding thumbnail images, which are created by the first electronic device. When the transmission of the fourth information to the second electronic device has failed, the server may transmit, to the first electronic device, sixth information indicating that the transmission of the fourth information has failed. When the sixth information is received, the first electronic device may delete the thumbnail images created by the first electronic device.

Meanwhile, when the fourth information is received, the second electronic device may create a second content group corresponding to the first content group 901 of the first electronic device. Further, the second electronic device may accept the request to share the first content group 901 from the first electronic device and may transmit seventh information corresponding to the acceptance to the server. Next, the second electronic device may receive the thumbnail image corresponding to each of the plurality of images created by the server from the server and may include the thumbnail image in the second content group. When the seventh information is received, the server may transmit, to the first electronic device, information indicating that the second electronic device has accepted the request to share the first content group 901, so that the first electronic device may display member information including the second electronic device on the screen corresponding to the first content group.

Meanwhile, the second electronic device may reject the request to share the first content group 901 from the first electronic device and may transmit eighth information corresponding to the rejection to the server. Subsequently, the second electronic device may delete the second content group. When the eighth information is received, the server may transmit, to the first electronic device, information indicating that the request to share the first content group 901 has been rejected, so that the first electronic device may not include the second electronic device in the member information on the screen corresponding to the first content group.

According to various example embodiments, after a first electronic device (for example, the first electronic device 410) shares a live content group with at least one electronic device (hereinafter, referred to as a second electronic device (for example, the second electronic device 450)), the first electronic device may add an image to the shared live content group. For example, when the user selects a content group creation icon, the first electronic device may display a content list screen. The user may select at least one contact among contacts included in a contact list and may set up a member to which a request to share a first content to be created by the first electronic device is made. The first electronic may make a request to share the first content group to be created to the server, and the server may create a folder corresponding to the first content group to be created. When an image to be included in the first content group to be created is selected according to a user input or a designated condition of the first electronic device, the first electronic device may create the first content group including the selected image and may store the image in the folder created by the server.

FIGS. 10A, 10B, 10C, 10D, 10E and 10F are diagrams illustrating an example operation in which a first electronic device (for example, the first electronic device 410) shares a live content group with at least one electronic device (hereinafter, referred to as a second electronic device (for example, the second electronic device 450)) and adds an image to the shared live content group according to various example embodiments.

Figure 10A:
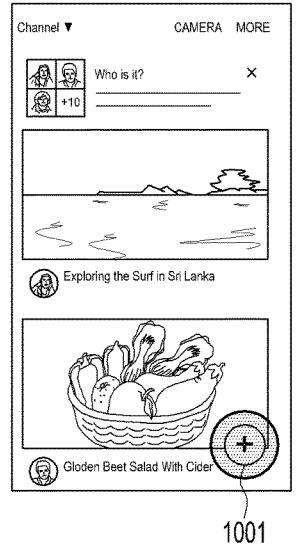
FIGS. 10A, 10B, 10C, 10D, 10E and 10F are diagrams illustrating an example operation in which a first electronic device shares a live content group with at least one electronic device and adds an image to the shared live content group according to various example embodiments.
Figure 10B:
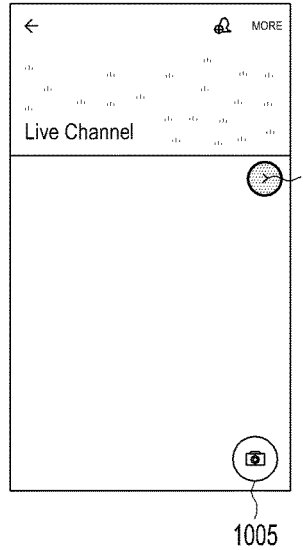
Figure 10C:
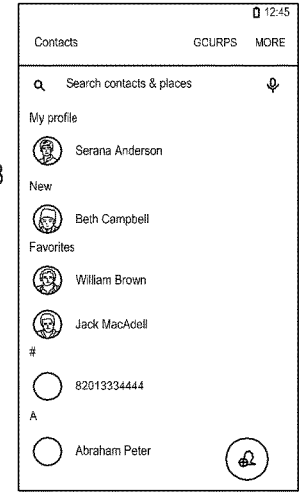
Figure 10D:
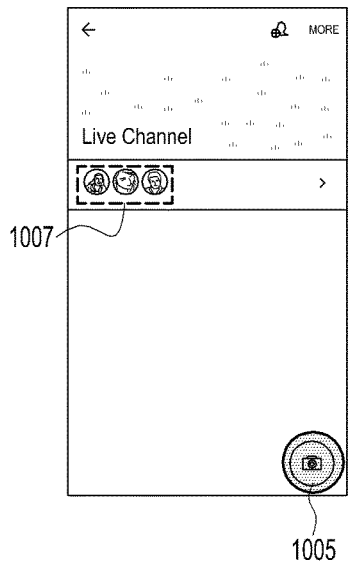

Referring to FIG. 10, when a content group creation icon 1001 is selected according to a user input on a gallery application execution screen as in FIG. 10A, the first electronic device may create a live content group including no image. The first electronic device may transmit the live content group to a server. The first electronic device may display a screen corresponding to the live content group as in FIG. 10B. The screen corresponding to the live content group may include a first icon 1003 for inviting at least one member to share a content group with and a second icon 1005 for running a camera application. When the first icon 1003 is selected according to a user input, a contact list may be displayed as in FIG. 10C and the first electronic device may select a contact corresponding to at least one member with whom to share the live content group from the contact list according to a user input. When the contact is selected, the first electronic device may transmit, through the server (for example, the server 430), push information for a request to share the live content group to the second electronic device corresponding to the contact and may share the live content group with the second electronic device. The first electronic device may display a sharing member 1007 of the live content group on the screen corresponding to the live content group as in FIG. 10D.

The second electronic device may receive the push information for the request to share the live content group through the server and may create and display a live content group corresponding to the live content group of the first electronic device on a gallery application of the second electronic device.

Figure 10E:
Figure 10F:
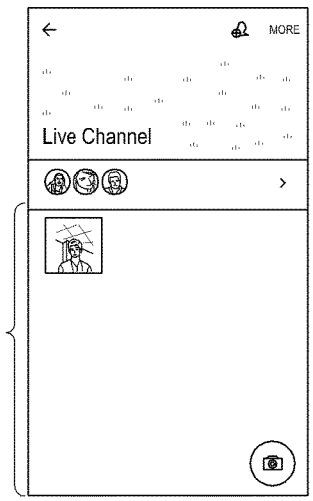

When the second icon 1005 is selected according to a user input, the first electronic device may run the camera application as in FIG. 10E. When a picture or video is taken using the camera application, the first electronic device may add the picture or video taken in real time to an image area 1009 of the screen corresponding to the live content group as in FIG. 10F, thereby sharing the picture or video with the second electronic device corresponding to the contact.

Although not shown, instead of running the camera application, the user may manually select and add an image stored in the electronic device to the image area 1009, thereby sharing the image with the second electronic device corresponding to the contact.

Meanwhile, both the first electronic device and the second electronic device may add an image to the live content group.

According to various example embodiments, after a first electronic device (for example, the first electronic device 410) creates a first content group, the first electronic device may share the first content group with at least one electronic device (hereinafter, referred to as a second electronic device (for example, the second electronic device 450)). For example, when the user of the first electronic device selects a content group creation icon, the first electronic device may create a live content group including no image and may request a server to create a folder corresponding to the live content group. When an image to be included in the live content group is selected according to a user input or a designated condition of the first electronic device, the first electronic device may include the selected image in the live content group to create the first content group. The first electronic device may transmit the selected image to the server, thereby storing the selected image in the folder corresponding to the live content group.

Figure 11A:
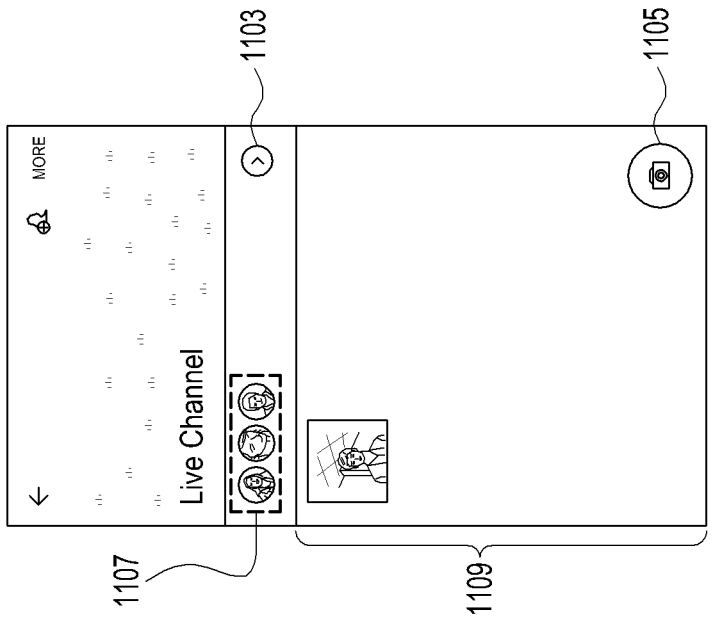
FIGS. 11A, 11B and 11C are diagrams illustrating an example operation in which a first electronic device creates a first content group and shares the first content group with at least one electronic device according to various example embodiments.
Figure 11B:
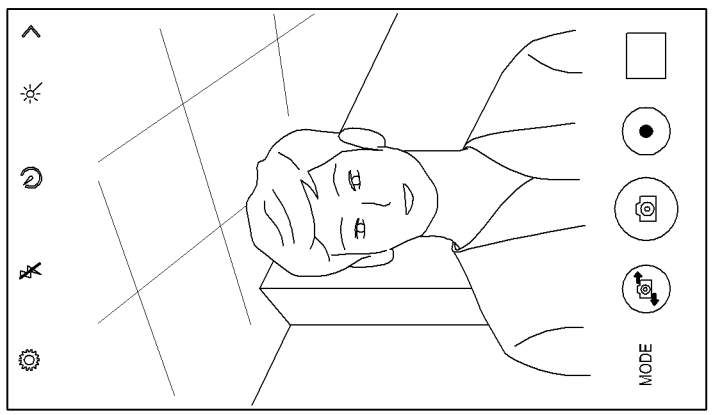
Figure 11C:
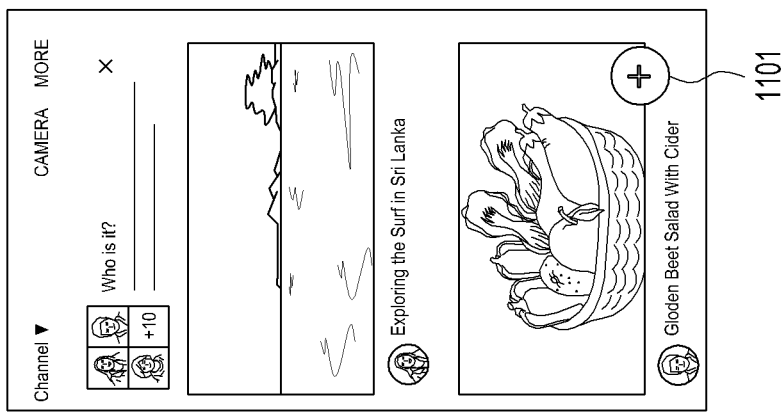

FIGS. 11A, 11B and 11C are diagrams illustrating an example operation in which a first electronic device (for example, the first electronic device 410) creates a first content group and shares the first content group with at least one electronic device (hereinafter, referred to as a second electronic device (for example, the second electronic device 450)) according to various example embodiments.

Referring to FIG. 11, when a content group creation icon 1101 is selected according to a user input on a gallery application execution screen as in FIG. 11A, the first electronic device may create a live content group.

The first electronic device may run a camera application as in FIG. 11B. The camera application may be automatically run when the content group creation icon 1101 is selected. Alternatively, the first electronic device may display a screen corresponding to the live content group according to the creation of the content group, in which the screen includes a second icon 1105 for running the camera application and the camera application may be run when the user selects the second icon 1105.

When a picture or video is taken using the camera application, the first electronic device may add the picture or video taken in real time to an image area 1109 of the screen corresponding to the live content group as in FIG. 11C. For example, the first electronic device may add the picture or video taken in real time to the image area 1109 of the screen corresponding to the live content group, thereby creating the first content group. The taken picture or video may be uploaded to a folder of a server corresponding to the first content group.

When camera photographing is finished, the first electronic device may go to the gallery application screen displaying the first content group with the picture or video added as in FIG. 11C.

The user may select an icon 1103 for inviting at least one member to share the first content group with and may select a contact of the at least one member to share the first content group with from a contact list. The first content group may be shared with the second electronic device corresponding to the contact through the server (for example, the server 450), and the first electronic device may display information 1107 corresponding to the contact on a screen corresponding to the first content group as in FIG. 11C.

The second electronic device may receive push information for a request to share the first content group through the server and may create and display a first content group corresponding to the first content group of the first electronic device on the gallery application of the second electronic device.

According to various example embodiments, sharing a content group may be based on a contact and may be performed by the content group. Further, the maximum number of members to share one content group may be designated.

According to various example embodiments, a first electronic device (for example, the first electronic device 410) may select at least one member to share a content group with from stored contacts, may synchronize with a server (for example, the server 430) for each contact, and may identify whether each contact joins a service of the server.

The server may be a core application server, and the service may be a core application service that manages an account for content group sharing and sharing. Joining the service may be joining the core application service through integrated authentication of the core application service during an Out Of Box Experience (OOBE) that is the same as a core application. When joining the service, the core application service becomes on, so that a content group sharing function may be used. Subsequently, even when the first electronic device is rebooted, the service is kept on, so that the content group sharing function may be continuously used. Further, when starting to share a content group, information on a registered user of the service is synchronized. If the user is a user of the service registered in a received contact, the user may be allowed to use the content group sharing function.

When the selected contact has joined the service, the selected contact is ready to receive a content group. Thus, when the first electronic device uploads information corresponding to the content group to the server, the first electronic device may transmit push information to a second electronic device (for example, the second electronic device 450) corresponding to the selected contact through the server. Subsequently, the second electronic device may automatically create a content group corresponding to the content group. Not only the first electronic device but the second electronic device may also upload an image to the content group, making two-way sharing between the first electronic device and the second electronic device possible.

When the selected contact has not joined the service, the first electronic device may transmit a Web URL to the selected contact.

For example, when the second electronic device is manufactured by a different manufacturer from that of the first electronic device, the second electronic device may not join the service, and accordingly the first electronic device may transmit a Web URL that enables viewing of an image uploaded to the server through an SMS to the second electronic device. In this case, the second electronic device may identify the image via a browser. To prevent the unlimited spread of a Web ULR, the Web URL may be protected by the first electronic device or server with a password of a contact (for example, the last four digits of a phone number) to which the Web URL is to be transmitted. Accordingly, when the second electronic device opens the Web URL, a screen for inputting the password is displayed and the second electronic device may input the password to identify the image via the browser.

When the second electronic device accepts a request to share the content group from the first electronic device, at least one image corresponding to the content group is downloaded through the server, so that the user of the second electronic device may view a screen of the content group corresponding to the content group of the first electronic device on the second electronic device.

It may be stored in the server whether a member receiving the request to share the content group accepts the request. Accordingly, a user not having accepted the request and a user having accepted the request may be displayed in a distinguished manner using UIs on content group screens of the first electronic device and the second electronic device, and the second electronic device as well as the first electronic device may identify whether members receiving the request from the first electronic device accept the request. Since the server is capable of storing a string about the content group, a function of commenting on a content group may also be added.

The server may store a list relating to an image (the addition of an image or deletion of image) of the content group, and the second electronic device may receive information on the list from the server. When there is list information after a synchronized time, the second electronic device may update the content group of the second group corresponding to the content group using the information on the list. For example, when there is image addition information, the second electronic device may add an image corresponding to an added image to the content group of the second electronic device. When there is image deletion information, the second electronic device may delete an image corresponding to a deleted image from the content group of the second electronic device. Further, the information on the list may be managed as a history of the content group.

Meanwhile, when the second electronic device rejects the request to share the content group from the first electronic device, the second electronic device may delete a live content group created according to the reception of the push information for sharing the content group, the member corresponding to the second electronic device may be deleted from members sharing the content group of the first electronic device, and the member corresponding to the second electronic device may be deleted from a list of the members receiving the request from the first electronic device.

Figure 12:
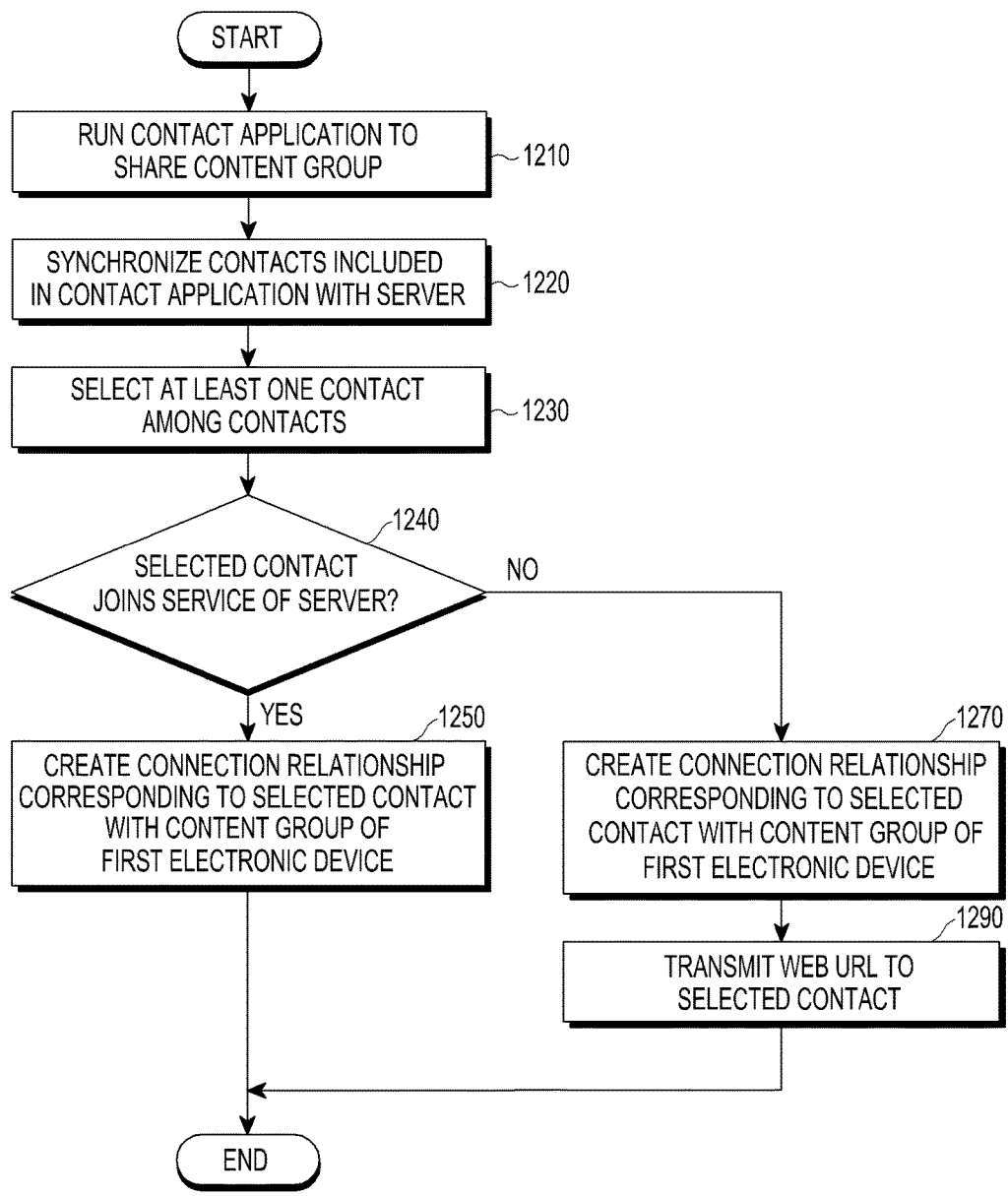
FIG. 12 is a flowchart illustrating an example operation of a first electronic device for sharing a content group according to various example embodiments.

FIG. 12 is a flowchart illustrating an example operation of a first electronic device (for example, the first electronic device 410) for sharing a content group according to various example embodiments.

Referring to FIG. 12, in operation 1210, the first electronic device may run a contact application to share a content group. When the contact application is run, the first electronic device may display a screen of a contact list including contacts.

In operation 1220, the first electronic device may synchronize the contacts included in the contact application with the server.

In operation 1230, the first electronic device may select at least one contact among the contacts based on a user input.

In operation 1240, the first electronic device may determine through the server whether the selected contact joins a service of the server. When the selected contact joins the service of the server in operation 1240, operation 1250 may be performed. Otherwise, operation 1270 may be performed.

In operation 1250, the server may create a connection relationship corresponding to the selected contact with the content group of the first electronic device. For example, the server may create the connection relationship corresponding the selected contact with the content group of the first electronic device using a Device Unique Identifier (DUID).

In operation 1270, the server may create the connection relationship corresponding to the selected contact with the content group of the first electronic device. For example, the server may create the connection relationship corresponding the selected contact with the content group of the first electronic device using a Mobile Station International ISDN Number (MSISDN).

In operation 1290, the server may transmit a Web URL to the selected contact.

Figure 13:
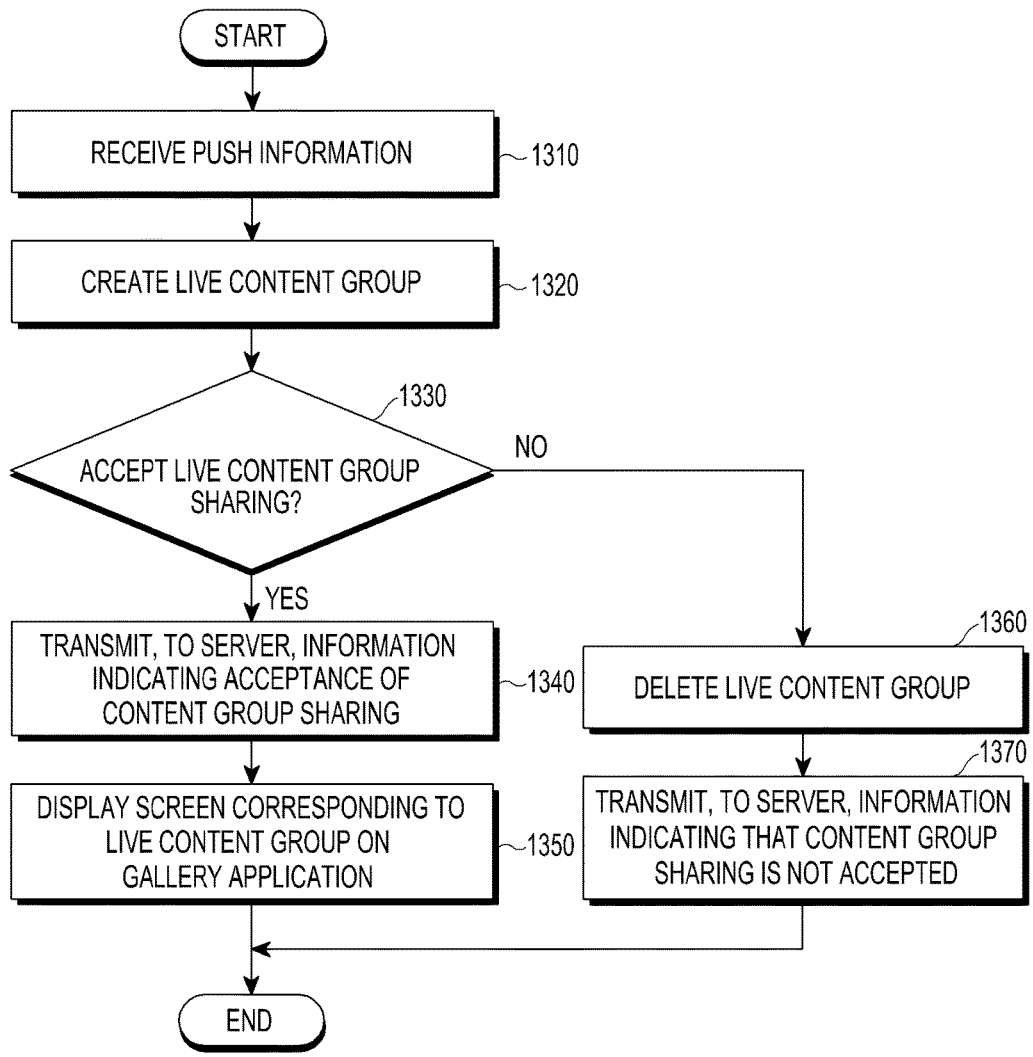
FIG. 13 is a flowchart illustrating an example operation of a second electronic device for sharing a content group according to various example embodiments.

FIG. 13 is a flowchart illustrating an example operation of a second electronic device (for example, the second electronic device 450) for sharing a content group according to various example embodiments.

In operation 1310, the second electronic device may receive push information (notification) from a server (for example, the server 430). The push information may be information for a first electronic device (for example, the first electronic device 410) to invite the second electronic device in order to share a content group.

In operation 1320, the second electronic device may create a live content group.

In operation 1330, the second electronic device may determine based on a user input whether to accept content group sharing. When it is determined to accept content group sharing in operation 1330, operation 1340 may be performed. Otherwise, operation 1360 may be performed.

In operation 1340, the second electronic device may transmit, to the server, information indicating the acceptance of content group sharing. When the information indicating the acceptance of content group sharing is received, the server may change state information on a member corresponding to the second electronic device to a content group sharing accepted state in member state information on the content group and may transmit, to the first electronic device, information indicating that the second electronic device has accepted content group sharing.

In operation 1350, the second electronic device may display a screen corresponding to the live content group on a gallery application of the second electronic device.

In operation 1360, the second electronic device may delete the live content group.

In operation 1370, the second electronic device may transmit, to the server, information indicating that content group sharing is not accepted.

According to various example embodiments, after a first electronic device (for example, the first electronic device 410) shares a first content group with a second electronic device (for example, the second electronic device 450) through a server (for example, the server 430), the first electronic device or the second electronic device may add an image to the first content group or may delete an image from the first content group.

For example, when the first electronic device adds an image to the first content group, the added image may be transmitted to the server. The server may transmit, to the second electronic device, push information indicating that sharing information on the first content group has been changed. The second electronic device may receive the push information, may download the image from the server using the information on the first content group changed in the server after the last synchronization time of the shared first content group received from the server, and may add the image to the first content group.

For example, when the first electronic device deletes an image from the first content group, information on the deleted image may be transmitted to the server. The server may transmit, to the second electronic device, push information indicating the sharing information on the first content group has been changed. The second electronic device may receive the push information, may retrieve an image to delete using the information on the first content group changed in the server after the last synchronization time of the shared first content group received from the server, and may delete the image from the first content group.

Figure 14:
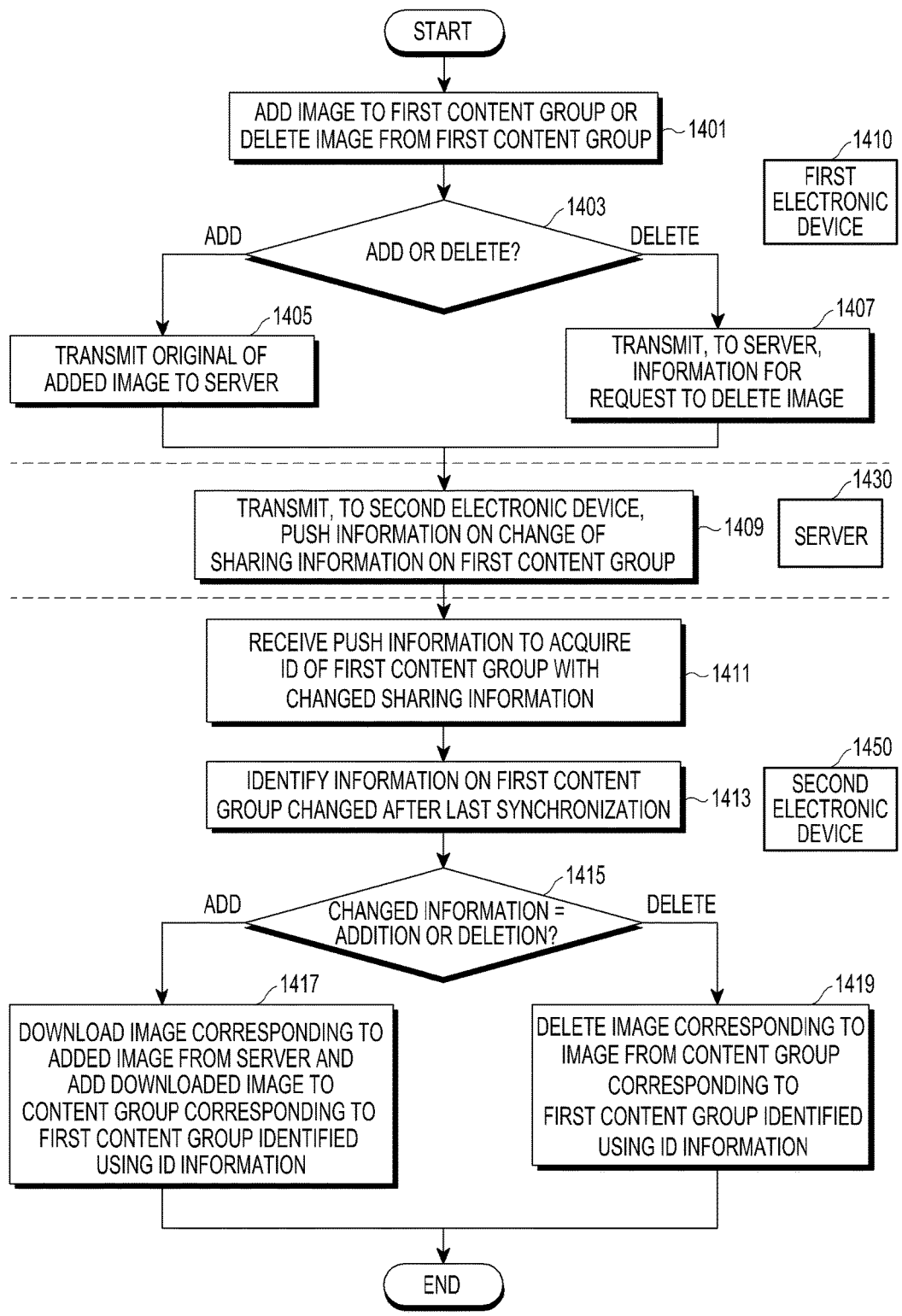
FIG. 14 is a flowchart illustrating an example operation in which a first electronic device updates a content group by adding an image to the content group or deleting an image from the content group when sharing the content group with a second electronic device through a server according to various example embodiments.

FIG. 14 is a flowchart illustrating an example operation in which a first electronic device 1410 (for example, the first electronic device 410) updates a content group by adding an image to the content group or deleting an image from the content group when sharing the content group with a second electronic device 1450 (for example, the second electronic device 450) through a server 1430 (for example, the server 430) according to various example embodiments.

Referring to FIG. 14, in operation 1401, the first electronic device 1410 may add an image to a first content group or may delete an image from the first content group.

When it is determined that the first electronic device 1410 adds an image to the first content group in operation 1403, the first electronic device 1410 may transmit the original of the added image to the server 1430 in operation 1405.

When it is determined that the first electronic device 1410 deletes an image from the first content group in operation 1403, the first electronic device 1410 may transmit, to the server, information for a request to delete the image in operation 1407.

In operation 1409, the server may transmit, to the second electronic device 1450, push information on a change of sharing information on the first content group according to operation 1405 or 1407. For example, push information on a change of the sharing information on the first content group according to operation 1405 may be information on the addition of the image, while push information on a change of the sharing information on the first content group according to operation 1407 may be information on the request to delete the image.

In operation 1411, the second electronic device 1450 may receive the push information to acquire the ID of the first content group with the changed sharing information.

In operation 1413, the second electronic device 1450 may identify the information on the first content group changed after the last synchronization.

When the second electronic device 1450 identifies that the changed information is the information on the addition of the image in operation 1415, operation 1417 may be performed. In operation 1417, the second electronic device 1450 may download an image corresponding to the added image from the server 1430 and may add the downloaded image to a content group corresponding to the first content group identified using the ID information.

When the second electronic device 1450 identifies that the changed information is the information on the request to delete the image in operation 1415, operation 1419 may be performed.

Figure 15:
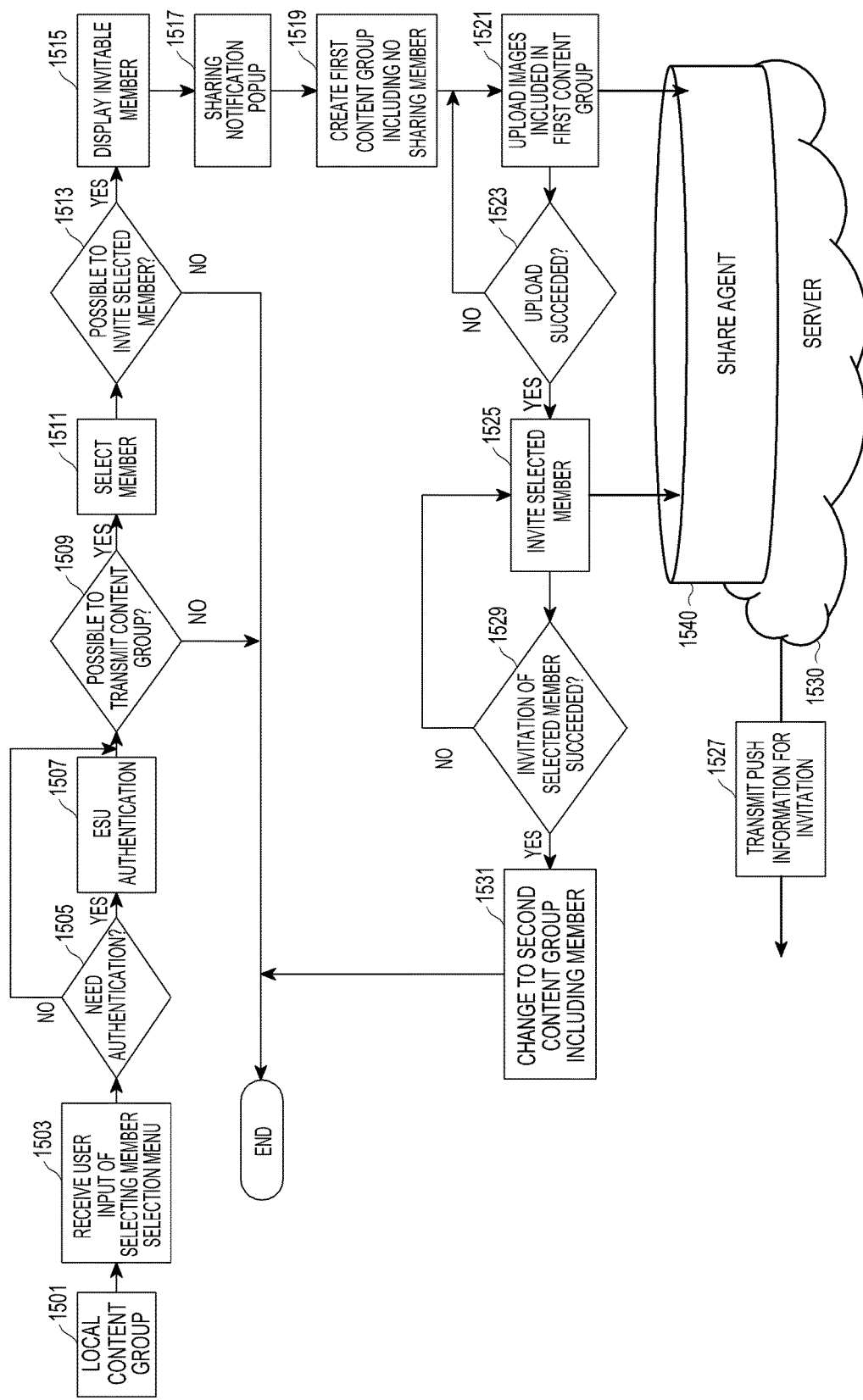
FIG. 15 is a flowchart illustrating an example operation of a first electronic device for creating a content group according to various example embodiments.

In operation 1419, the second electronic device 1450 may retrieve an image corresponding to the image from the content group corresponding to the first content group identified using the ID information and may delete the image. FIG. 15 is a flowchart illustrating an operation of a first electronic device (for example, the first electronic device 410) for creating a content group according to various example embodiments.

In operation 1503, the first electronic device may receive a user input of selecting a member selection menu for sharing a (local) content group 1501 stored in the first electronic device.

In operation 1505, the first electronic device may determine whether the authentication of the first electronic device is needed.

In operation 1507, when the first electronic device joins a service that manages an account for content group sharing and sharing, it may be determined that the authentication is not needed, and operation 1509 may be performed.

In operation 1507, when the first electronic device does not join the service that manages the account for content group sharing and sharing, it may be determined that the authentication is needed.

In operation 1507, the Easy Sign Up (ESU) authentication of the first electronic device may be performed through a server that provides the service.

In operation 1509, the first electronic device may determine the possibility of transmitting the content group 1501. The possibility of transmitting the content group 1501 may be determined based on the designated number (N1) of content groups that the first electronic device is allowed to join and the designated number (N2) of image files that are transmittable per day. For example, when N1 is smaller than 200 and N2 is smaller than 2000, the first electronic device may perform operation 1511. Otherwise, the first electronic device may end the operation of the present embodiment.

In operation 1511, the first electronic device may select a member with whom to share the content group 1501 according to a user input.

In operation 1513, the first electronic device may determine the possibility of inviting the selected member. The possibility of inviting the selected member may be determined according to whether the number of selected members is 0. For example, when the number of selected members is 0, the operation of the present embodiment may be ended. Otherwise, operation 1515 may be performed.

In operation 1515, the first electronic device may display an invitable member.

In operation 1517, the first electronic device may display a sharing notification popup indicating that the first electronic device is to share the content group 1501 with the invitable member.

In operation 1519, the first electronic device may create a first content group which does not include a member sharing the content group 1501.

In operation 1521, the first electronic device may upload images included in the first content group to the server 1530 through a share agent 1540.

In operation 1523, the first electronic device may determine whether the upload succeeded. When the upload succeeded, operation 1525 may be performed. Otherwise, operation 1521 may be repeated.

In operation 1525, the first electronic device may transmit information for inviting the selected member to the server 1530 through the share agent 1540. Here, the server 1530 may transmit push information for the invitation to a second electronic device corresponding to the selected member.

In operation 1529, the first electronic device may receive information through the server 1530 to determine whether the invitation of the selected member succeeded. When it is determined that the invitation of the selected member succeeded in operation 1529, operation 1531 may be performed. Otherwise, operation 1525 may be repeated.

In operation 1531, the first electronic device may change the first content group to a second content group including the member.

Figure 16:
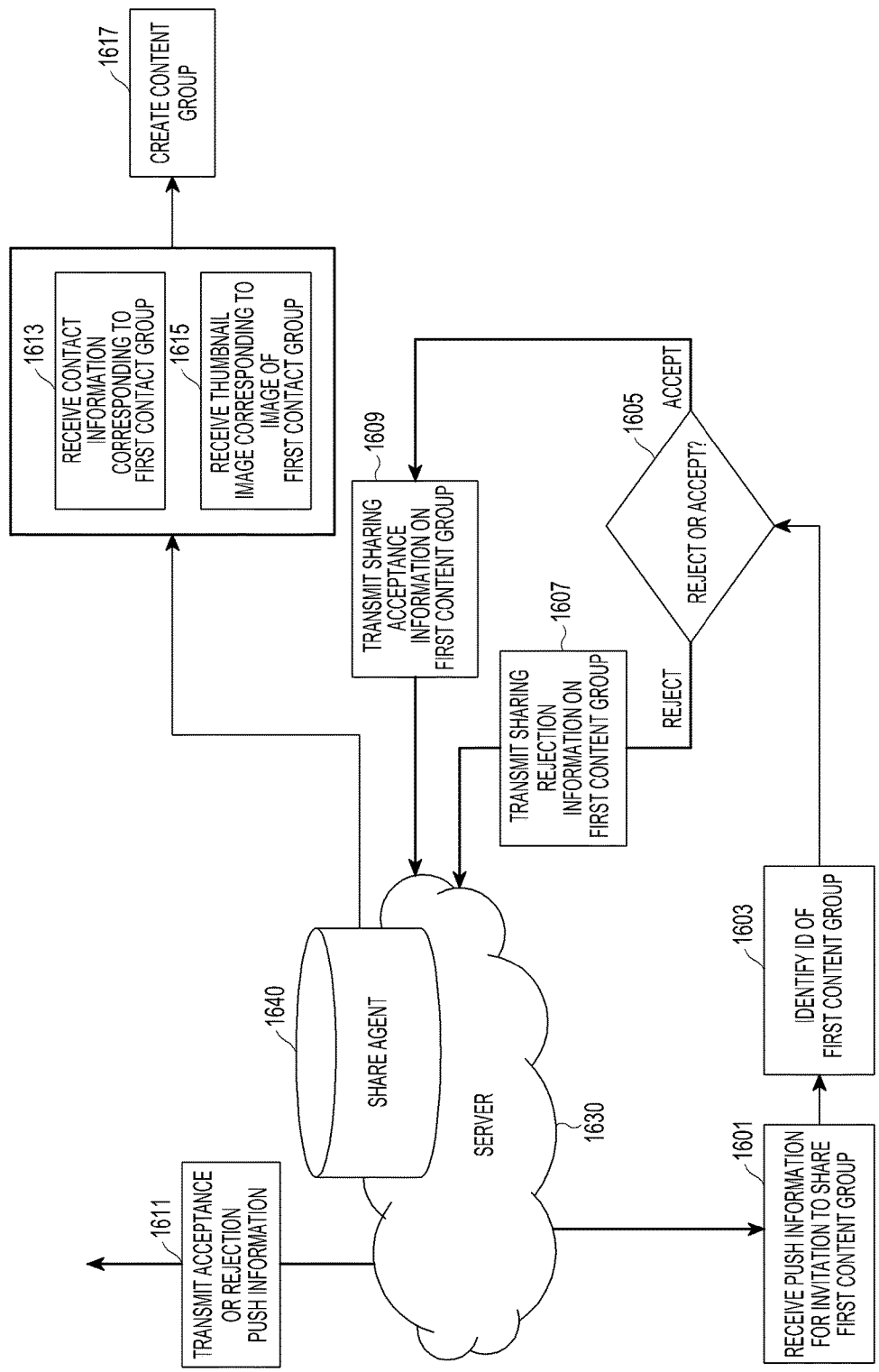
FIG. 16 is a flowchart illustrating an example operation of a second electronic device for creating a content group according to various example embodiments.

FIG. 16 is a flowchart illustrating an example operation of a second electronic device (for example, the second electronic device 450) for creating a content group according to various example embodiments.

In operation 1601, the second electronic device may receive push information for invitation to share a first content group, which is transmitted from a first electronic device (for example, the first electronic device 410) to a server 1630.

In operation 1603, the second electronic device may identify the ID of the first content group.

In operation 1605, the second electronic device may select to reject or accept the invitation according to a user input.

When the second electronic device selects to reject the invitation in operation 1605, the second electronic device may transmit, to the server 1630, sharing rejection information on the first content group in operation 1607.

When the second electronic device selects to accept the invitation in operation 1605, the second electronic device may transmit, to the server 1630, sharing acceptance information on the first content group in operation 1609.

In operation 1611, the server 1630 may transmit acceptance push information according to operation 1609 or rejection push information according to operation 1607 to the first electronic device using a share agent 1640.

After transmitting the acceptance push information according to operation 1609 to the first electronic device, the second electronic device may receive contact information corresponding to the first contact group from the first electronic device through the share agent 1640 of the server 1630 in operation 1613.

After transmitting the acceptance push information according to operation 1609 to the first electronic device, the second electronic device may receive a thumbnail image corresponding to an image of the first contact group from the first electronic device through the share agent 1640 of the server 1630 in operation 1615.

Operation 1613 and operation 1615 may be performed simultaneously or separately.

In operation 1617, the second electronic device may create a content group using the received contact information and the received thumbnail image.

Figure 17:
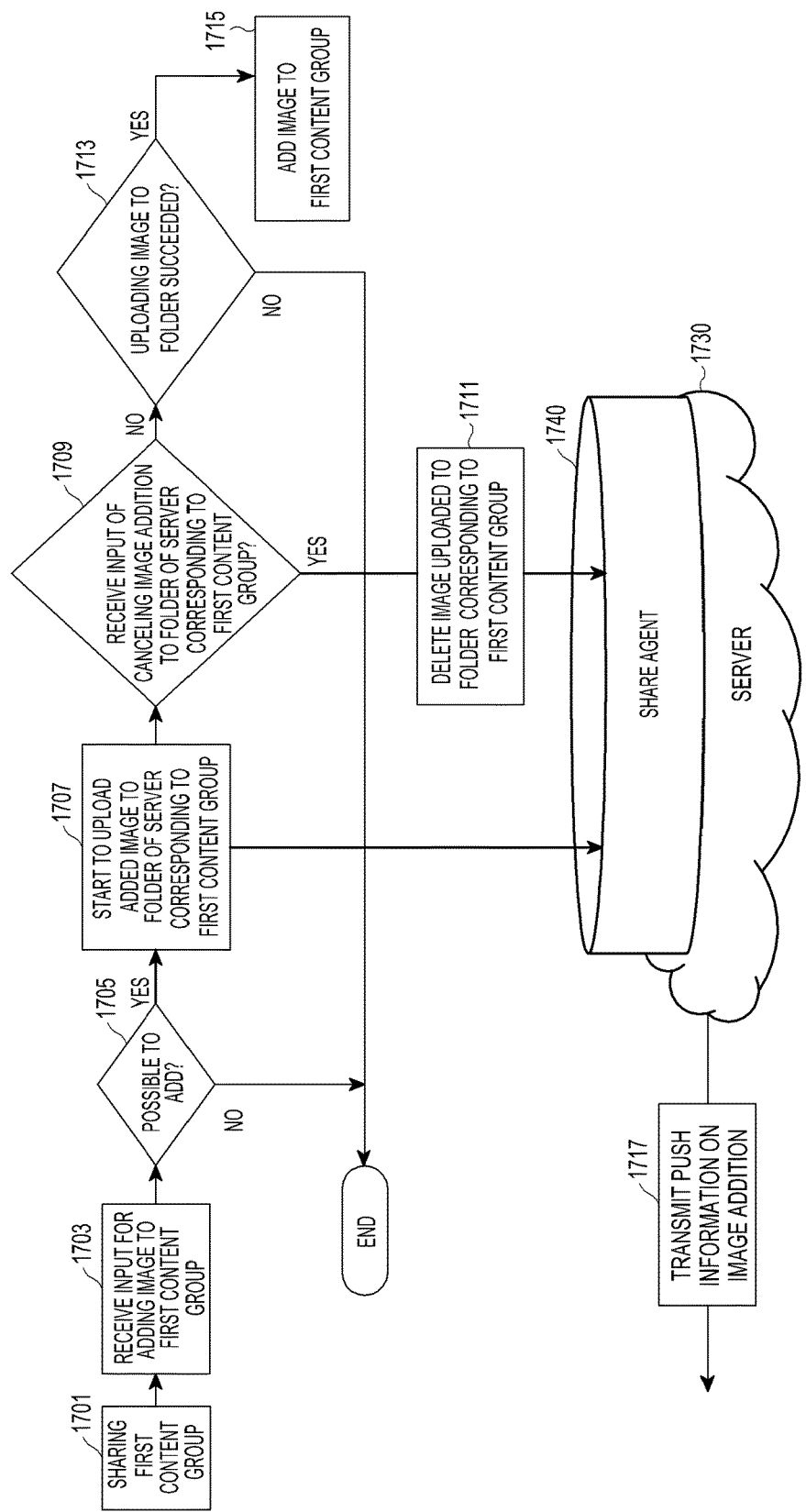
FIG. 17 is a flowchart illustrating an example operation of adding an image to a first content group of a first electronic device or a second electronic device according to various example embodiments.

FIG. 17 is a flowchart illustrating an example operation of adding an image to a first content group of a first electronic device (for example, the first electronic device 410) or a second electronic device (for example, the second electronic device 450) according to various example embodiments. The following description is made with reference to the first electronic device for example.

In operation 1703, the first electronic device may receive an input for adding an image to a (sharing) first content group 1701.

In operation 1705, the first electronic device may determine the possibility of adding the image. The possibility of adding the image may be determined based on the designated number (N2) of image files that are transmittable per day. For example, when N2 is smaller than 2000, operation 1707 may be performed. Otherwise, the operation of the present embodiment may be ended.

In operation 1707, the first electronic device may start to upload the added image to a folder of a server 1730 corresponding to the first content group 1701.

In operation 1709, the first electronic device may determine whether an input of canceling the addition of the image to the folder of the server 1730 corresponding to the first content group 1701 is received.

When it is determined that the input of canceling the addition of the image is received in operation 1709, the first electronic device may delete the image uploaded to the folder in operation 1711.

When it is determined that the input of canceling the addition of the image is not received in operation 1709, the first electronic device may determine whether uploading the image to the folder succeeded in operation 1713.

When it is determined that uploading the image to the folder succeeded in operation 1713, the image may be added to the first content group 1701 in operation 1715. Also, in operation 1717, the server 1730 may transmit push information on image addition to a second electronic device.

When it is determined that uploading the image to the folder failed in operation 1713, the operation of the operations of the present example embodiment may be ended.

Figure 18:
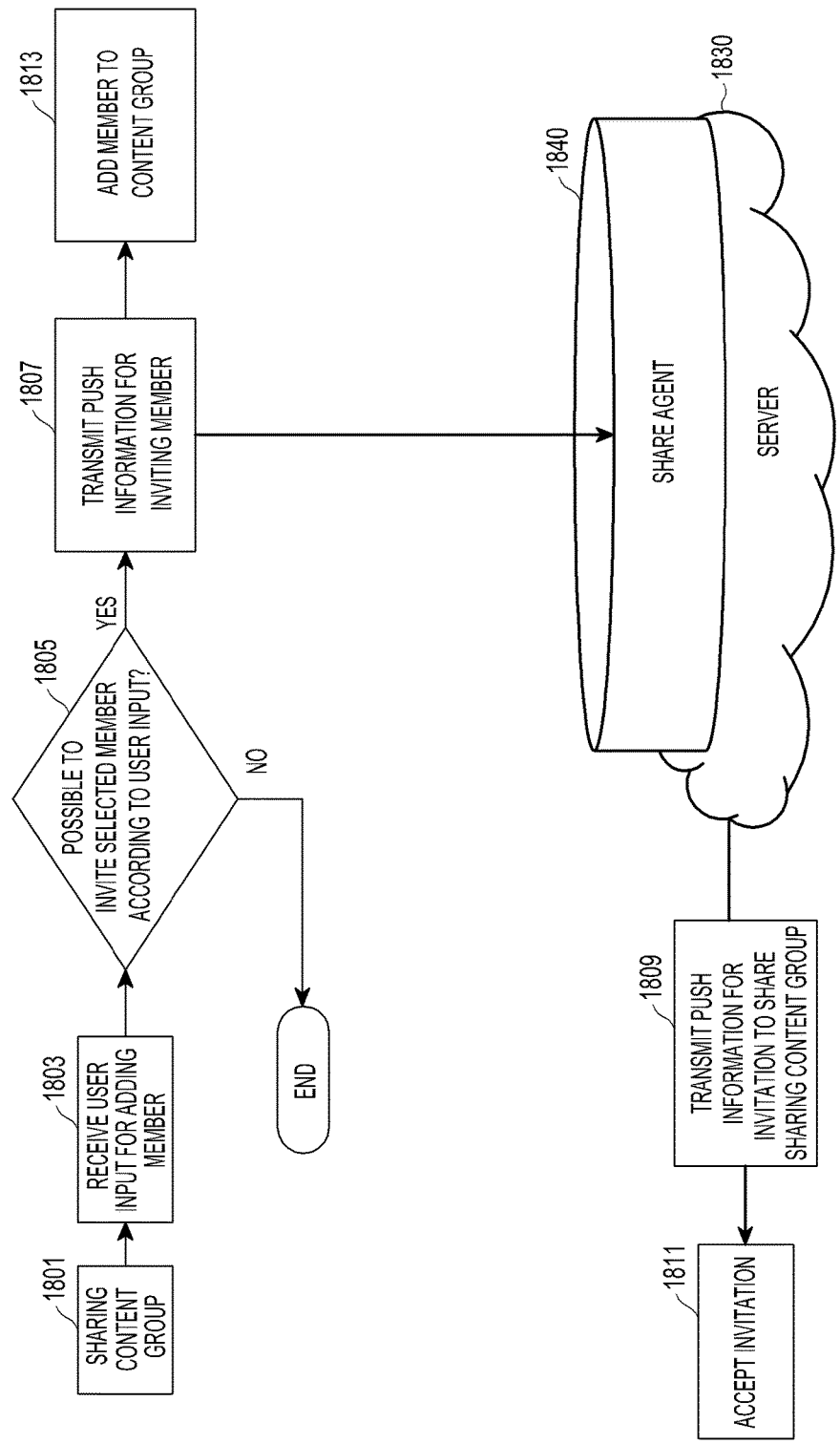
FIG. 18 is a flowchart illustrating an example operation in which a first electronic device invites a member to share a first content group with according to various example embodiments.

FIG. 18 is a flowchart illustrating an example operation in which a first electronic device (for example, the first electronic device 410) invites a member with whom to share a first content group according to various example embodiments.

In operation 1803, the first electronic device may receive a user input for adding a member to a (sharing) first content group 1801.

In operation 1805, the first electronic device may determine the possibility of inviting a member selected according to the user input. The possibility of inviting the selected member may be determined according to the designated number (N3) of members and the designated number (N4) of invitable members per day. For example, when N3 is smaller than 10 and N4 is smaller than 200, operation 1807 may be performed. Otherwise, the operation of the present embodiment may be ended.

In operation 1807, the first electronic device may transmit push information for inviting the member to a server 1830 through a share agent 1840.

In operation 1809, the server may transmit push information for invitation to share the content group 1801 to a second electronic device corresponding to the member.

When the second electronic device accepts the invitation to the content group 1801 in operation 1811, the information may be transmitted to the first electronic device through the server 1830. In operation 1813, the first electronic device may add the member to the content group 1801.

Figure 19:
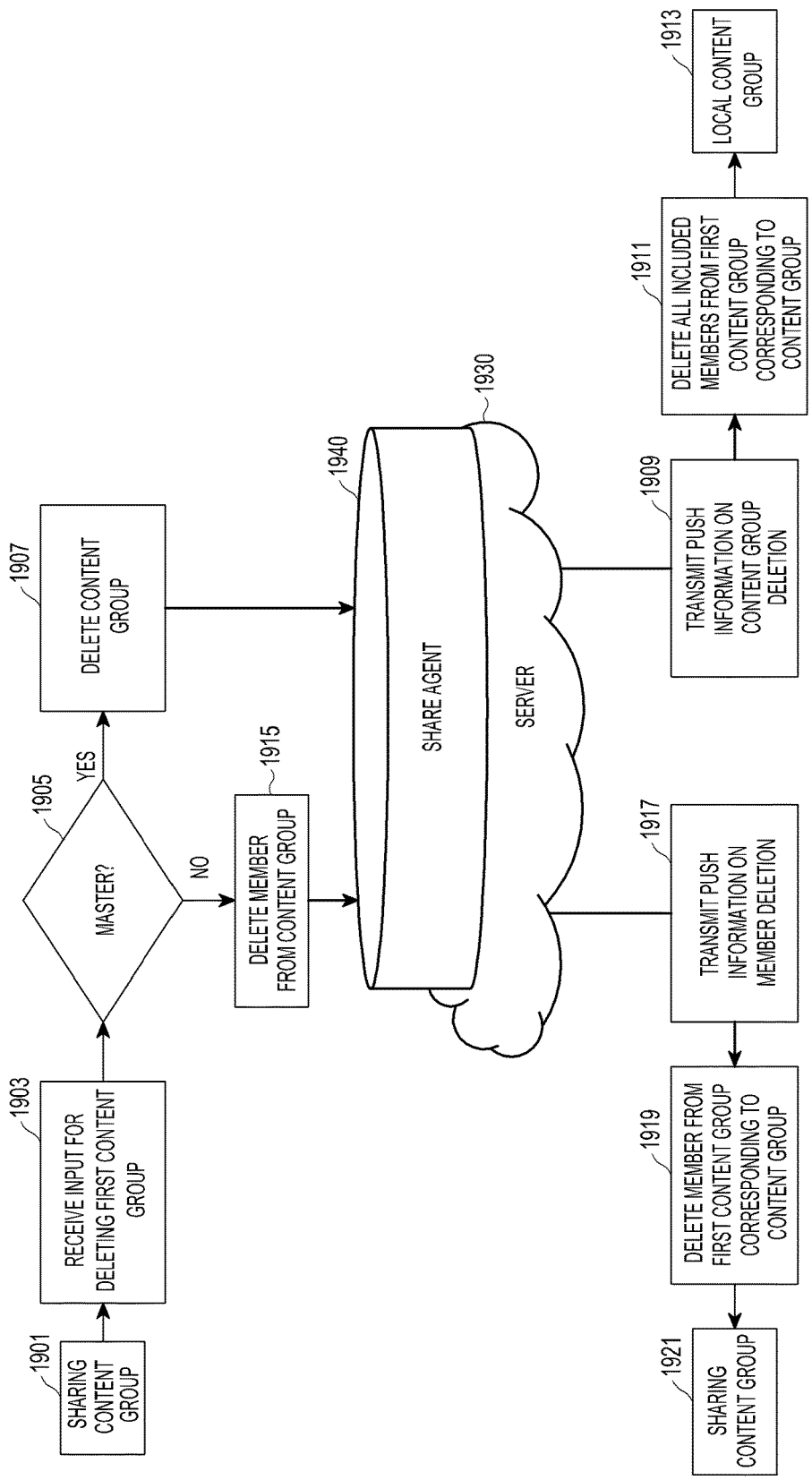
FIG. 19 is a flowchart illustrating an example operation of deleting a first content group of a first electronic device or a second electronic device according to various example embodiments.

FIG. 19 is a flowchart illustrating an example operation of deleting a first content group of a first electronic device (for example, the first electronic device 410) or a second electronic device (for example, the second electronic device 450) according to various example embodiments. The following description is made with reference to the first electronic device for example.

In operation 1903, the first electronic device may receive an input for deleting a (sharing) content group.

In operation 1905, the first electronic device may determine whether the first electronic device is a master. When the first electronic device is an agent that created the content group 1901, the first electronic device may be a master.

When the first electronic device determines that the first electronic device is a master in operation 1905, operation 1907 may be performed. Otherwise, operation 1915 may be performed.

In operation 1907, the first electronic device may delete the content group 1901 and may transmit this information to a server 1930 through a share agent 1940.

In operation 1909, the server 1930 may transmit push information on the deletion of the content group 1901 to a second electronic device.

In operation 1911, the second electronic device may delete all included members from a first content group corresponding to the content group 1901, thereby creating a local content group 1913 from the first content group.

In operation 1915, the first electronic device may delete a member corresponding to the first electronic device from the content group 1901 and may transmit this information to the server 1930 through the share agent 1940.

In operation 1917, the first electronic device may transmit push information on the deletion of the member to the second electronic device.

In operation 1919, the second electronic device may delete the member from the first content group corresponding to the content group 1901 and may maintain a content group 1921 with the member deleted.

The member corresponding to the first electronic device may be deleted from the first content group corresponding to the content group 1901.

Figure 20:
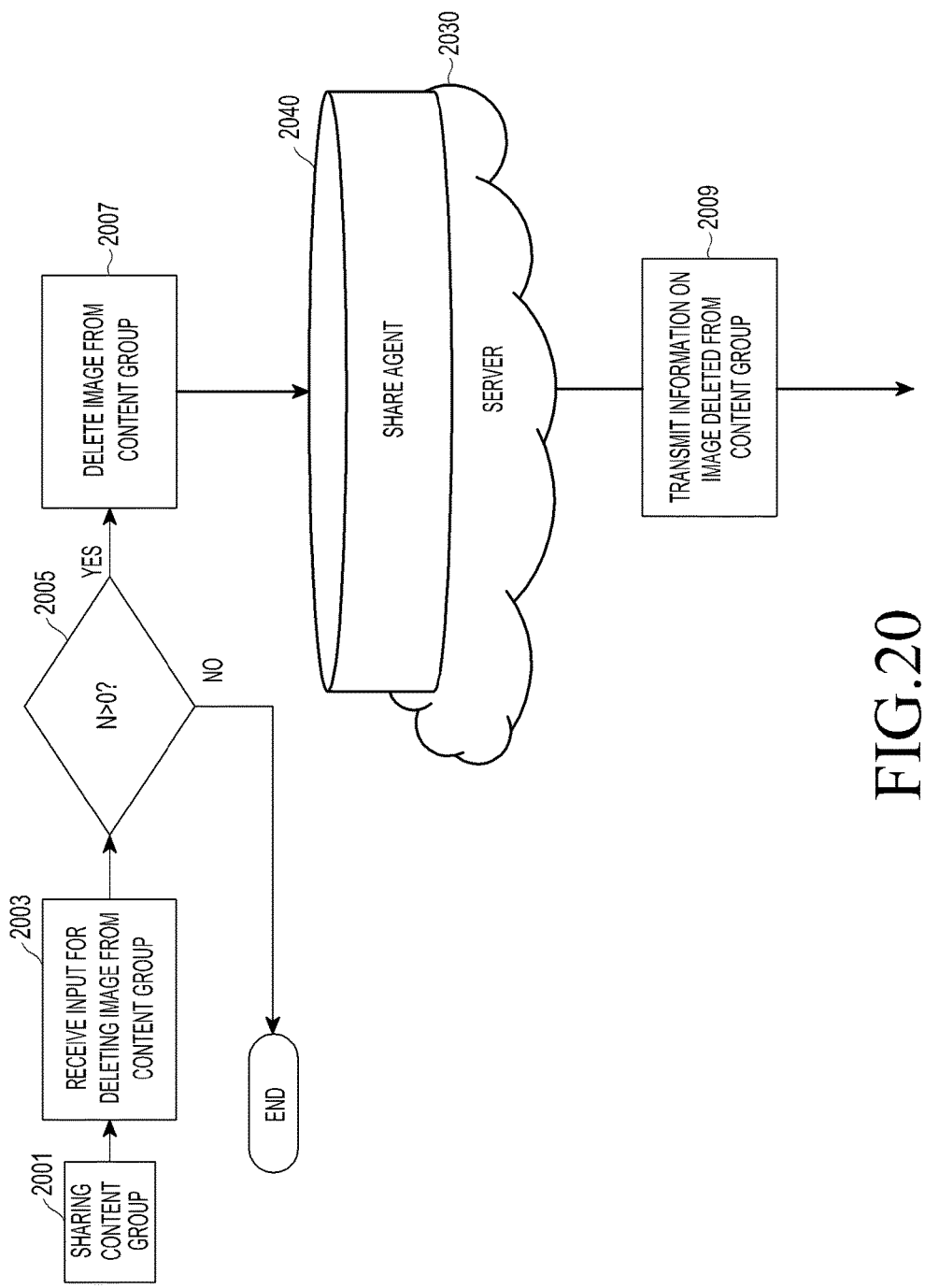
FIG. 20 is a flowchart illustrating an example operation of deleting an image included in a first content group of a first electronic device or a second electronic device according to various example embodiments.

FIG. 20 is a flowchart illustrating an example operation of deleting an image included in a first content group of a first electronic device (for example, the first electronic device 410) or a second electronic device (for example, the second electronic device 450) according to various example embodiments. The following description is made with reference to the first electronic device for example.

In operation 2003, the first electronic device may receive an input for deleting an image from a (sharing) content group 2001.

In operation 2005, the first electronic device may determine the number (N) of images included in the content group 2001 is greater than 0. When N is greater than 0, the first electronic device may perform operation 2007. Otherwise, the operation of the present embodiment may be ended.

In operation 2007, the first electronic device may delete an image from the content group 2001 and may transmit this information to a server 2030 through a share agent 2040.

In operation 2009, the server may transmit information on the image deleted from the content group 2001 to a second electronic device.

According to various example embodiments, when a first electronic device receives a user input of transmitting update information on a sharing content group (for example, image deletion and image addition) to a server and subsequently receives a user input of canceling the execution of the update information, upload to the sever may be retained. Further, transmission failure occurs when the first electronic device transmits the update information on the sharing content group (for example, image deletion and image addition) to the server, upload to the server may be retained.

According to various example embodiments, the first electronic device may recognize a content-group person to create one content group for the same person. When an image of the same person is added after the creation of the content group, adding the added image to the content group is recommended, thereby increasing the consumption of the image. This function may enable members sharing a content group to share pictures of the same person in electronic devices thereof in the content group, thereby sharing images with other people.

For example, the first electronic device may recognize face information on images stored in the first electronic device using face recognition information. A content group manager included in the first electronic device may collect pictures attributed to the same person based on the recognized face information and may show, to a user, information 2101 in a card form in FIG. 21A. When the user selects the information 2101, the first electronic device may display the pictures attributed to the same person in a thumbnail format in FIG. 21B. Further, the first electronic device may display a screen for inputting a title of a content group to be created. When the user selects desired pictures to create one content group among the pictures displayed in the thumbnail format, the first electronic device may create a content group 2103 based on selected persons as in FIG. 21C. When the user inputs a title, the input title may be determined as a title of the content group. When the user inputs no title, the first electronic device may automatically create a title of the content group.

Figure 21D:
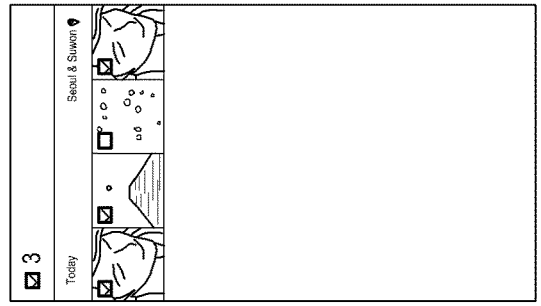
FIGS. 21A, 21B, 21C and 21D are diagrams illustrating an example screen for creating a human recognition information-based content group according to various example embodiments.
Figure 21C:
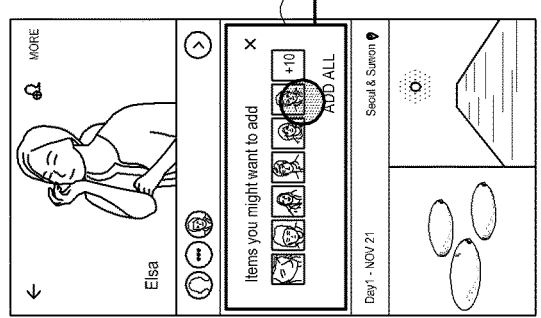
Figure 21B:
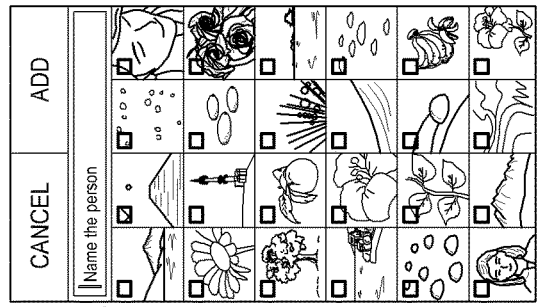
Figure 21A:
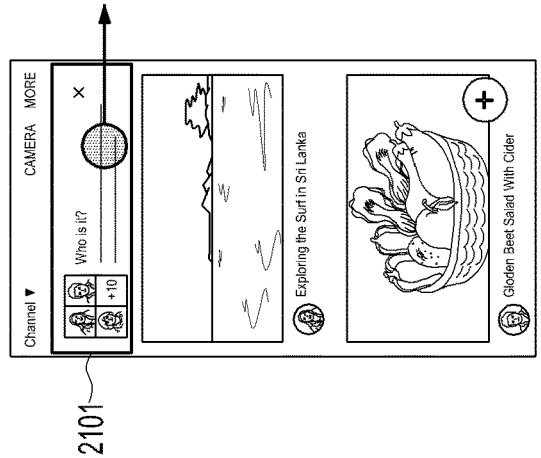

When the first electronic device acquires a picture of the person corresponding to the content group, the first electronic device may automatically recommend the picture of the person to the content group as in FIG. 21D. When the user selects a desired picture, the first electronic device may add the selected picture to the content group.

Figure 22:
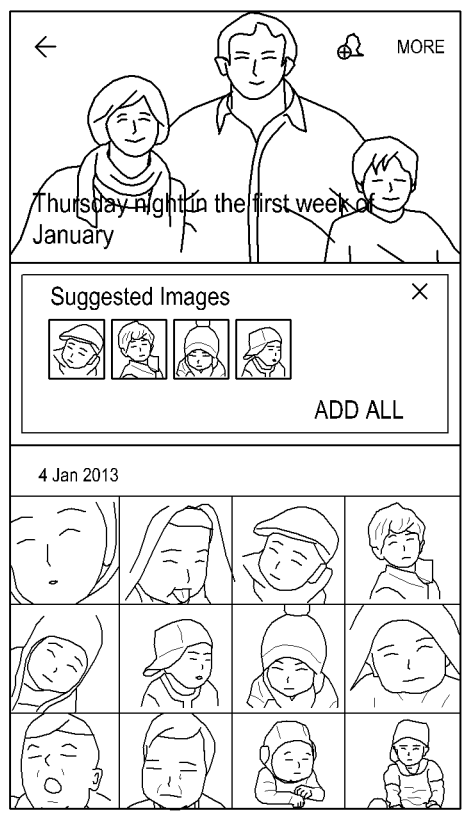
FIG. 22 is a diagram illustrating an example screen for creating a time information-based content group according to various example embodiments.

According to various example embodiments, regarding an automatically created content group, as illustrated in FIG. 22, a content group may be created based on time information on images, and the created content group may be updated. Accordingly, members sharing the content group may collect similar images stored in electronic devices thereof to share the images with other people.

For example, the first electronic device may classify pictures at a specific date according to time and may measure the average number of pictures at each time. The first electronic device may set, as a peak, the time at which pictures exceeds the average number of pictures. When there are pictures as a result of checking time slots before and after the peak, a cluster of the time slots may be defined as a moment. Spaces between moments are compared to calculate a reference time between the moments, the moments are grouped based on the reference time to be defined as a content group, and the start time and the end time of the content group may be stored.

When a picture is subsequently added to the content group created in the above manner, the first electronic device may compare the time at which the picture is taken with the start time and the end time of the created content group to create a popup of images additionally suggested for the content group. An individual image may be selected by selecting a thumbnail of the popup or all images may be selected using an ADD ALL button. An automatic recommendation function that suggests adding images to a content group in content group settings may be on or off.

According to various example embodiments, the first electronic device may recommend a name of a content group.

For example, the first electronic device may manually create a content group according to a user input. The first electronic device combines tag information on selected images to automatically create a title of the content group and shows the title as in FIG. 23C.

Figure 23A:
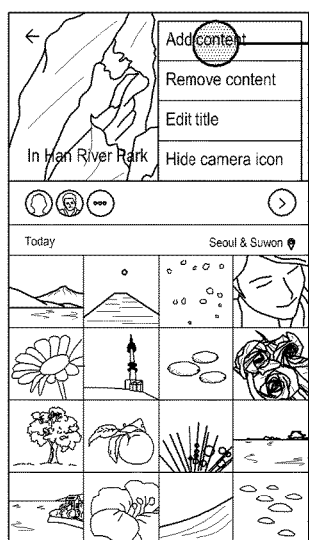
FIGS. 23A, 23B and 23C are diagrams illustrating an example screen for creating a title of a content group according to various example embodiments.
Figure 23B:
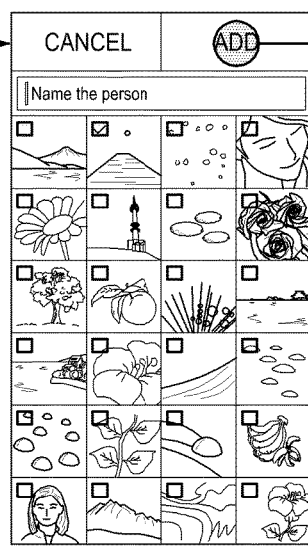

For another example, when the user selects an Add content on a screen in FIG. 23A, the first electronic device may display thumbnails of images recommended to create a content group as in FIG. 23B, and the user may select thumbnails of desired images and select an ADD menu. When the ADD menu is selected, the first electronic device may combine tag information on the selected images to automatically create a title of the content group and may show the title as in FIG. 23C.

Figure 23C:
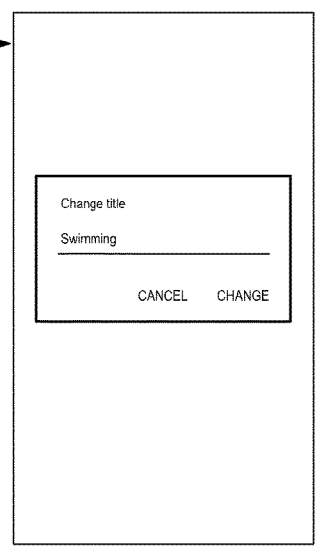

Meanwhile, when a rename menu of the content group is selected, the first electronic device may combine tag information on images in the content group to automatically create a title of the content group and may show the title as in FIG. 23C.

According to various example embodiments, a method for sharing a content group of an electronic device includes: transmitting, to a server, information for a request to share a content group; receiving an input of selecting at least one contact with which the content group is to be shared; transmitting information on the at least one contact to the server; and changing the content group to a shared state when information on acceptance of sharing the content group from at least one external electronic device corresponding to the at least one contact is received from the server, wherein the content group is updatable by the electronic device or the at least one external electronic device.

According to various example embodiments, the content group may include at least one image.

According to various example embodiments, the method may further include: transmitting the at least one image included in the content group to the server; and converting the at least one image into a thumbnail image in a thumbnail format, and the changing of the content group to the shared state may include changing the at least one image to the corresponding thumbnail image.

According to various example embodiments, the changing of the content group to the shared state may further include including information corresponding to the at least one contact in the content group.

According to various example embodiments, the method may further include: when the electronic device receives a user input for releasing the shared state, transmitting, to the server, information corresponding to a release from the shared state; and changing the content group, which is changed to the shared state, to a local state, and the changing of the content group to the local state may include changing the thumbnail image to the corresponding image.

According to various example embodiments, the method may further include changing the content group, which is changed to the shared state, to a local state when receiving, from the server, information for releasing the shared state from the at least one external electronic device, and the changing of the content group to the local state may include changing the thumbnail image to the corresponding image.

According to various example embodiments, the at least one image may be configured in a link file of an original image stored in the electronic device.

According to various example embodiments, the content group may be an empty content group including no image.

According to various example embodiments, the method may further include: including at least one image in the content group; transmitting the at least one image included in the content group to the server; and converting the at least one image into a thumbnail image in a thumbnail format.

According to various example embodiments, the method may further include: receiving, from the server, a list indicating whether sharing the content group is accepted by the at least one each contact; and displaying the list indicating whether sharing the content group is accepted on a screen of the electronic device.

According to various example embodiments, updating may include at least one of including at least one image in the content group and deleting at least one image from the content group.

According to various example embodiments, when the electronic device has at least one image corresponding to the content group, the electronic device may display, on a screen, information to recommend including the at least one image in the content group.

The term "module" as used herein may include a unit including hardware, software, and/or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, various processing circuitry, a dedicated processor, a CPU, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various example embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

It will be understood that the various example embodiments of the present disclosure are provided for purposes of illustration and to aid in understanding of the disclosure, and are thus illustrative and not limiting. It will be understood by one or ordinary skill in the art that various modifications, alternatives and variations of the example embodiments may be realized without departing from the true spirit and full scope of the disclosure as defined by the appended claims.

What is claimed is:

1. A method for sharing a content group of an electronic device, the method comprising:
   displaying a first screen corresponding to the content group, which is for sharing at least one image;
   transmitting, to a server, a request to share a content group with at least one external electronic device;
   receiving a response corresponding to the request to share the content group from the server;
   in response to receiving the response corresponding to the request, transmitting the at least one image included in the content group to the server;
   receiving acceptance of sharing the content group from the at least one external electronic device from the server;
   in response to the receiving of the acceptance of the sharing the content group, generating a thumbnail image corresponding to the at least one image;
   updating the content group by changing the at least one image to the thumbnail image corresponding to the at least one image; and
   displaying a second screen corresponding to the updated content group.

2. The method of claim 1, further comprising: when the electronic device receives an input for releasing a shared state after updating the content group,
   transmitting, to the server, information corresponding to a release from the shared state; and
   changing the content group, which is changed to the shared state, to a local state,
   wherein the changing of the content group to the local state comprises changing the thumbnail image to the at least one image corresponding to the thumbnail image.

3. The method of claim 1, further comprising: changing the content group to a local state, when receiving, from the server, information for releasing a shared state from the at least one external electronic device after updating the content group, wherein the changing of the content group to the local state comprises changing the thumbnail image to the at least one image corresponding to the thumbnail image.

4. The method of claim 1, wherein the at least one image is configured in a link file of an original image stored in the electronic device.

5. The method of claim 1, further comprising:
   generating other content group comprising no image;
   including at least one other image in the other content group;
   transmitting the at least one other image in the other content group to the server; and
   change the at least one other image into a other thumbnail image.

6. The method of claim 1, further comprising:
   receiving, from the server, a list indicating whether sharing the content group is accepted by each of the at least one contact; and
   displaying a list indicating whether sharing the content group is accepted on a screen of the electronic device.

7. An electronic device comprising:
   communication circuitry;
   an input device comprising input circuitry;
   a display; and
   a processor configured to:
   control the display to display a first screen corresponding to the content group, which is for sharing at least one image,
   transmit, to a server, a request to share a content group with at least one external electronic device through the communication circuitry,
   receive a response corresponding to the request to share the content group from the sever,
   in response to receiving the response corresponding to the request to share the content group from the server, transmit the at least one image included in the content group to the server through the communication circuit,
   receive acceptance of sharing the content group from the at least one external electronic device from the server through the communication circuitry,
   in response to the receiving of the acceptance of the sharing the content group, generate a thumbnail image corresponding to the at least one image;
   update the content group by changing the at least one image to the thumbnail image corresponding to the at least one image; and
   control the display to display a second screen corresponding to the updated content group.

8. The electronic device of claim 7, wherein when an input for releasing the shared state is received through the input device, the processor is configured to:
   transmit, to the server, information corresponding to a release from the shared state through the communication interface after updating the content group; and
   change the thumbnail image to the at least one image corresponding to the thumbnail image to change the content group, which is changed to the shared state, to a local state.

9. The electronic device of claim 7, wherein when information for releasing a shared state from the at least one external electronic device is received from the server through the communication interface after updating the content group, the processor is configured to change the thumbnail image to the image corresponding to the thumbnail image to change the content group, which is changed to the shared state, to a local state.

10. The electronic device of claim 7, wherein the at least one image is included in a link file of an original image stored in the electronic device.

11. The electronic device of claim 7, wherein the processor is further configured to:
   generate another content group comprising no image;
   include at least one other image in the another content group;
   transmit the at least one other image in the another content group to the server; and change the at least one another image into another thumbnail image.

12. The electronic device of claim 7, wherein the processor is configured to: include a new image in the content group; transmit the new image included in the content group to the server through the communication circuitry.

13. The electronic device of claim 7, wherein when a list indicating whether sharing the content group is accepted by each of the at least one contact is received from the server through the communication circuitry, the processor is configured to control the display to display the list indicating whether sharing the content group is accepted.

14. The electronic device of claim 7, wherein the processor is further configured to delete the at least one image from the content group.

15. The electronic device of claim 7, wherein when there are one or more images corresponding to the content group in a memory, the processor is configured to control the display to display information to recommend including the one or more images in the content group.

* * * * *